(12) United States Patent
Feinbloom et al.

(10) Patent No.: US 12,585,124 B2
(45) Date of Patent: Mar. 24, 2026

(54) VISUALIZATION SYSTEM WITH LIGHTING

(71) Applicant: Designs for Vision, Inc., Bohemia, NY (US)

(72) Inventors: Richard E. Feinbloom, New York, NY (US); Moty Solomon, Beit uiel (IL)

(73) Assignee: Designs for Vision, Inc., Bohemia, NY (US)

( * ) Notice: Subject to any disclaimer, the term of this patent is extended or adjusted under 35 U.S.C. 154(b) by 0 days.

(21) Appl. No.: 18/907,477

(22) Filed: Oct. 5, 2024

(65) Prior Publication Data

US 2025/0053013 A1 Feb. 13, 2025

Related U.S. Application Data

(60) Provisional application No. 63/673,565, filed on Jul. 19, 2024, provisional application No. 63/661,255, filed on Jun. 18, 2024.

(51) Int. Cl.
G02B 27/00 (2006.01)
G02B 7/10 (2021.01)
(Continued)

(52) U.S. Cl.
CPC ........... G02B 27/0172 (2013.01); G02B 7/10 (2013.01); G02B 27/0176 (2013.01);
(Continued)

(58) Field of Classification Search
CPC .. G02B 27/0172; G02B 7/10; G02B 27/0176; G02B 27/025; G02B 2027/0138; G02B 2027/014; G02B 2027/0154; G02B 27/01;

G02B 27/0101; G02B 27/0103; G02B 27/0149; G02B 27/017; G02B 27/0179; G02B 27/0189; G02B 2027/0105; G02B 2027/0107; G02B 2027/0109; G02B 2027/011; G02B 2027/0112; G02B 2027/0114; G02B 2027/0116;
(Continued)

(56) References Cited

U.S. PATENT DOCUMENTS

2002/0163486 A1 11/2002 Ronzani
2015/0253589 A1* 9/2015 Finkman ............. G02B 25/008
359/240

(Continued)

OTHER PUBLICATIONS

"Notification of Transmittal of the International Search Report and Written Opinion of the International Searching Authority or the Declaration" Dec. 31, 2025.

*Primary Examiner* — Henry Duong
(74) *Attorney, Agent, or Firm* — Law Office of Carl Giordano, PC

(57) ABSTRACT

A user-wearable visualization system comprising a carrier suitable for the retention of a lighting assembly and a viewing and collection system allows for the collection of images or video of objects under one or more lighting conditions, wherein the collected images may be enhanced or merged together to form a more detailed presentation of an object being viewed and presented to a user on a local display. Further disclosed are lighting assemblies that provide for the light necessary to collect images under different lighting conditions and optical filtering that allows for a limitation of the light viewable and collected.

11 Claims, 24 Drawing Sheets

(51) Int. Cl.
  G02B 27/01           (2006.01)
  G02B 27/02           (2006.01)
(52) U.S. Cl.
  CPC .... G02B 27/025 (2013.01); *G02B 2027/0138*
      (2013.01); *G02B 2027/014* (2013.01); *G02B*
                      *2027/0154* (2013.01)
(58) Field of Classification Search
  CPC ...... G02B 2027/0118; G02B 2027/012; G02B
              2027/0121; G02B 2027/0123; G02B
              2027/0125; G02B 2027/0127; G02B
              2027/0129; G02B 2027/013; G02B
              2027/0132; G02B 2027/0134; G02B
              2027/0136; G02B 2027/0141; G02B
              2027/0143; G02B 2027/0145; G02B
              2027/0147; G02B 2027/015; G02B
              2027/0152; G02B 2027/0156; G02B
              2027/0158; G02B 2027/0159; G02B
              2027/0161; G02B 2027/0163; G02B
              2027/0165; G02B 2027/0167; G02B
              2027/0169; G02B 2027/0174; G02B
              2027/0178; G02B 2027/0181; G02B
              2027/0183; G02B 2027/0185; G02B
              2027/0187; G02B 2027/019; G02B
              2027/0192; G02B 2027/0194; G02B
              2027/0196; G02B 2027/0198
  USPC ......................................................... 359/630
  See application file for complete search history.

(56)                References Cited

U.S. PATENT DOCUMENTS

| | | | | |
|---|---|---|---|---|
| 2017/0143442 | A1* | 5/2017 | Tesar | ...................... H04N 23/63 |
| 2017/0322410 | A1* | 11/2017 | Watson | ................. G06T 19/006 |
| 2019/0254754 | A1* | 8/2019 | Johnson | ................. A61B 34/76 |
| 2021/0396988 | A1* | 12/2021 | Steier | ................... A61B 5/0017 |
| 2022/0121280 | A1 | 4/2022 | Jones | |
| 2024/0107143 | A1* | 3/2024 | Lee | ..................... G02B 27/0172 |
| 2024/0168275 | A1 | 5/2024 | Feinbloom | |
| 2025/0053013 | A1 | 2/2025 | Feinbloom | |

* cited by examiner

VISUALIZATION SYSTEM WITH LIGHTING

CLAIM OF PRIORITY

This application claims, pursuant to 35 USC 119, priority to, and the benefit of the earlier filing date of patent application Ser. No. 63/673,565, filed on Jul. 19, 2024 and 63/661,255, filed on Jun. 18, 2024, the contents of which are incorporated by reference, herein.

FIELD OF THE INVENTION

This application relates to the field of optical viewing devices and more specifically to devices for viewing and recording images of objects under different lighting conditions.

RELATED APPLICATIONS

This application is related to, and incorporates by reference, the content and disclosure, in their entirety, of U.S. Pat. No. 11,231,165—Multiple Light Source Configuration; U.S. Pat. No. 11,099,376—User Wearable Fluorescence Enabled Visualization System; U.S. Pat. No. 10,895,735—Magnification Devices with Filtering and Method for Selection of Said Filters; U.S. Pat. No. 10,061,115—Magnification Device and Assembly, U.S. Pat. No. 10,247,384—LED Lighting assembly and Method of Manufacturing Same; U.S. Pat. No. 7,690,806—Illuminating Headlamp Providing Substantially Uniform Illumination; and US Published Patent Application 2024/0168275; and those patents and patent applications that depend as Continuation, Divisional, Continuation-in-Part from the above referred to US Patents.

BACKGROUND OF THE INVENTION

Head-borne or wearable eyewear utilizing telescopic lens provide a practitioner with a magnified view of an area that the practitioner is viewing. Whether this is a patient's mouth, as in the case of a dentist, or in a body cavity, as in the case of a surgeon, the magnified view enables the practitioner to both see details that may not be viewable without the telescopic lens and provide more precise location of their instruments.

In addition, image capture devices (e.g., digital cameras) have allowed for the capturing and memorializing the images (photographic and/or video) viewed by a practitioner.

Smart microscopes use microscope cameras to capture magnified images of an area being viewed through the microscope. And further provide for the identification of areas of infection that remain doing a surgical or dental procedure.

However, such devices are large, stationary and expensive and generally used by pathologists to analyze segments that may be taken outside of the area where the procedure is occurring. The smart microscope, while providing for the real-time capturing of a magnified image during a procedure (e. g., open-heart surgery) are expensive to install and operate, and further require skilled technical support to maintain them properly.

Hence, there is a need in the industry for the capturing of photographic and/or video images, in real-time, during dental or medical procedures (or other fields where close inspection and viewing is required) that provides for the real-time presentation of image and/or information data to the user.

SUMMARY OF THE INVENTION

Disclosed is a user-wearable device comprising telescopic lenses and image capture devices that allows for the viewing of a magnified image of an object and the capturing of images of the object under the same or different lighting conditions and an incorporated display system that provides digital representations of the images collected to the user in real-time.

Disclosed is a user-wearable device comprising telescopic lenses and image capture devices that allows for the capturing of images with a different magnification level then the magnification level a user sees, under the same or different lighting conditions, and a display system that provides to the user in real-time digital representations of the images collected.

Disclosed is a user-wearable multi-light/recording system comprising a magnification system, a filtering system and a display system that allows for the viewing of an object and for the collection of images of the object under different lighting conditions and further presents, in real time, a representation of the collected images to a user.

Disclosed is a user-wearable multi-light, multi-camera system comprising a lighting system that illuminates an object with light in different wavelength ranges and a user wearable device comprising a magnification device to allow the magnified viewing of the object and an image capture device for the concurrent capturing of a photo or video of the object being viewed under the different lighting conditions.

Disclosed are embodiments of a user-wearable recording and image collection system comprising a lighting system that emits light in at least one of a plurality ranges extending from ultra-violet to infra-red wavelength and a user wearable device comprising a magnification device for viewing a magnified image of an object illuminated by the emitted light and an image capture device(s) configured to collect images of the illuminated object(s) under the different lighting condition and a display system that presents the collected images to a user. In one aspect of the invention, the image capture devices may capture images of objects illuminated by light in a limited wavelength range in at least one of the ultra-violet (UV), visible light and infra-red light (IR).

Disclosed are exemplary embodiments of a user-wearable multi-light, multi-camera systems comprising a lighting system, a magnification system, a light filtering system, and image capture device system that allows for the concurrent viewing and capturing of images of an object under different lighting conditions, wherein the captured images are stitched (or merged) together to form a combined image viewable by the user.

Disclosed are exemplary embodiments of a user-wearable multi-light, multi-camera systems comprising a lighting system, a magnification system, and image capture device system that allows for the concurrent viewing and capturing of images of an object under different lighting conditions, wherein the captured images are stitched (or merged) together to form a combined image viewable by the user.

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented to clarify the most useful and readily understood description of the principles and conceptual aspects of the invention. In this regard, no attempt is made to show structural details of the invention in more detail than is necessary for a fundamental understanding of the invention. The description taken with the drawings make apparent to those skilled in the art how the several forms of the invention may be embodied in practice.

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings.

Figure 1:
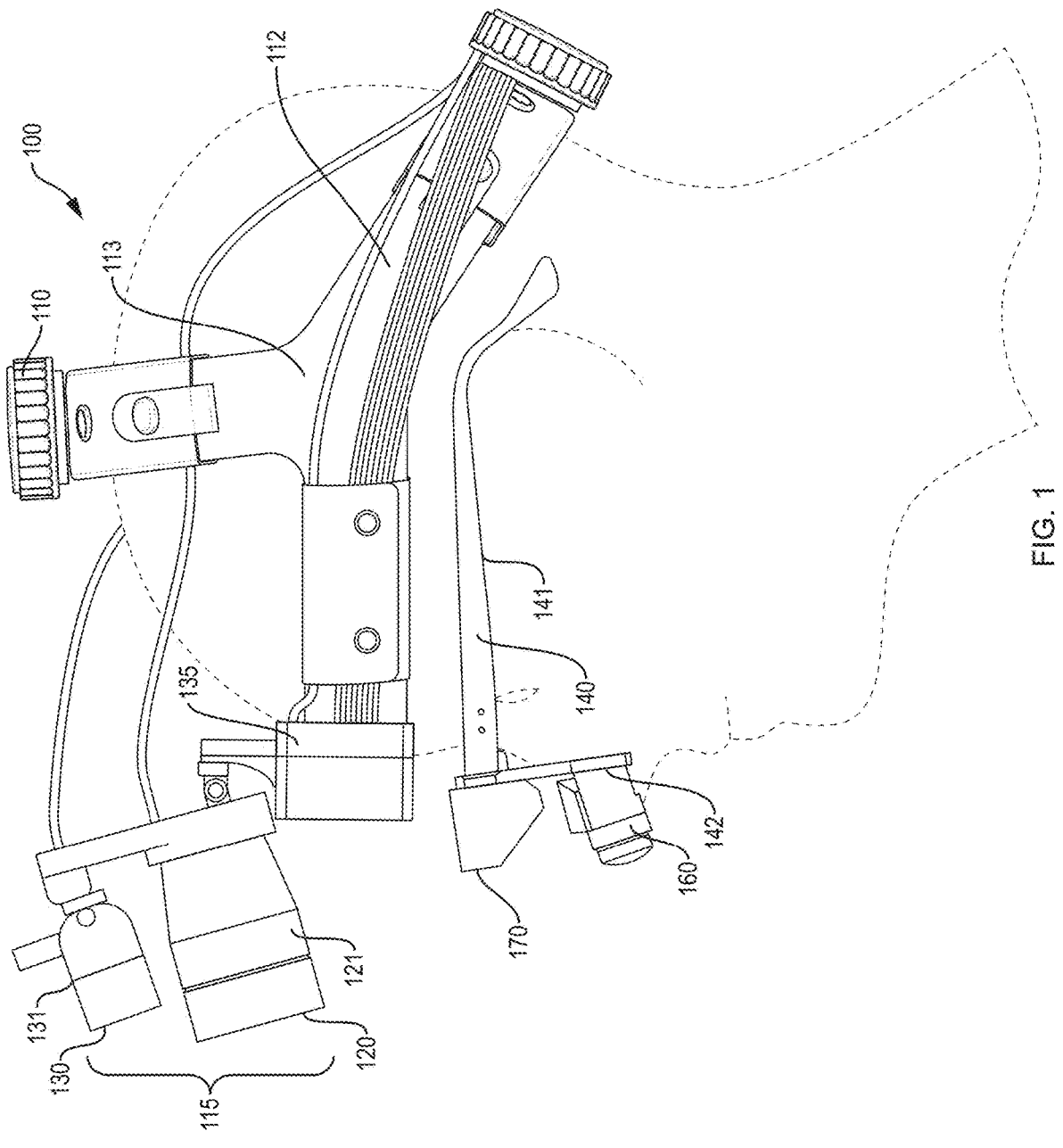
FIG. 1 illustrates a side view of an exemplary embodiment of a Multiple Light/Recording Assembly with Digital Presentation System in accordance with the principles of the invention.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description, herein, should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one skill in the art would consider equivalent to the recited value (i.e., having the same function or result). In any instance, the terms "about" may include numbers that are rounded (or lowered) to the nearest significant figure.

Although the terms "perpendicular" and "orthogonal" are used herein to describe a relationship between two elements, it would be understood and recognized by those skilled in the art that the terms "perpendicular" and "orthogonal" are not used in the mathematical sense (i.e., precisely ninety (90) degrees). But rather in the manufacturing sense wherein a tolerance value is imposed. Such tolerance values may be considered, for example, +/−1 degree. Thus, the terms "substantially perpendicular, "substantially "orthogonal," "substantially center," etc. should be understood as being used to represent a relationship between elements in the manufacturing sense (i.e., within known tolerance values).

FIG. 1 illustrates a side view of an exemplary embodiment of a visualization system in accordance with the principles of the invention.

In this illustrated side view, visualization system 100 comprises a head mountable element 110 used to secure lighting and recording assembly 115 to a user. Head mountable element 110 comprises at least a head band 112 that encircles the user's head and, an optional, head-strap 113 that retains headband 112 tightly to the user.

Lighting and recording assembly 115 comprises a light housing 121, containing, therein, lighting assembly 120 and an image/recording housing 131 containing, therein, an image capturing or recording assembly 130, wherein lighting assembly 120 is directed to project light onto an object (not shown) a known distance from a user and capture/ recording capturing or recording assembly 130 is oriented to capture images of the object.

In this illustrated aspect of the invention, lighting assembly 120 comprises a single lighting assembly that may include at least one lighting source (not shown) that is selected to emit light in at least one known wavelength band.

For example, light emitted by lighting assembly 120 may be one of a white light (i.e., visible), a non-visible (i.e., an ultra-violet light, an infra-red light) or a visible light in one or more visible, non-white, light bands (referred to as colored light). More specifically, lighting assembly 120 may emit light in a non-visible ultra-violet wavelength range of about 10 to about 400 nanometer (nm). Or may emit light in one or more of a visible color light range. For example, in one or more specific color wavelength ranges (e.g., violet— 380-435 nm; blue—435-495 nm; cyan—495-515; green— 720-570 nm; yellow—570-590 nm; orange—590-620 nm and red—620-50 nm). Alternatively, lighting assembly 120 may emit a light in a non-visible infra-red wavelength range (greater than 700 nm). Additionally, lighting assembly 120 may emit light as a white light (i.e., 380-50 nm). Alternatively, lighting assembly 120 may emit light in or combinations of the discussed wavelength ranges.

In one aspect of the invention, the light emitted by lighting assembly 120 may be emitted individually or concurrently. In another aspect of the invention, the intensity of the light emitted by lighting assembly 120 may be varied when light of different wavelength bands is emitted concurrently.

Although specific wavelength ranges are discussed above, it would be recognized that the wavelength ranges are merely representative of light wavelength ranges as different sources may quote different specific values for the disclosed color wavelength ranges.

Image capture/recording assembly 130 comprises one or more image capture devices suitable for capturing images of an object illuminated by the light emitted by lighting assembly 120. In one aspect of the invention, image capture/ recording assembly 130 may comprise one or more of a visible light image capture devices (e.g., a digital camera, CCD sensor, CMOS sense), an ultra violet light image capture device and an infra-red image capture device.

As illustrated, lighting and recording assembly 115 is attached to headband 110, which includes processing element (or system) 135. Processing element 135 represents a means for providing and controlling power (electrical energy) to lighting assembly 120 and recording assembly 130. Processing element 135 further provides a means for transmitting information from recording assembly 130 to an external device for subsequent processing. Alternatively, processing element 135 may include processing capability to process the received images and provide the processed images as information, as desired. Processing element 135 includes electrical and electronic components (e.g., resistors, capacitors, integrated circuits, etc.), which are well-known in the art and, thus, a detailed discussion of the elements of processing element 135 is believed not necessary to those skilled in the art to understand the principles of the invention claimed. Processing element 135 may further include elements for the wired or wireless transmission of the images captured by recording assembly 130 to an externally located (e.g., remote) processor for subsequent storage and processing.

Although the orientation of lighting assembly 120 and image capturing or recording assembly 130 is shown as being vertically offset from one another, it would be understood by those skilled in the art to change the orientation of assemblies 120 and 130 without altering the scope of the invention claimed.

FIG. 1 further illustrates eyewear 140 including frame 142 and temple 141 extending from frame 142. Temple 141 provides a means for retaining eyewear 140 to the user.

Incorporated into eyewear 140 is magnification elements 160 and viewing element 170. Magnification elements 160 provides an enlarged view of the object (not shown) illustrated by lighting assembly 120. As would be understood in the art, magnification elements 160 are typically constructed to achieve a desired level of magnification, wherein an enlarged image of objects a known distance (within a field of view) from magnification devices are rendered in focus to the user.

Display system or viewing element 170 presents to a user information associated with a digital presentation of the images captured by image capture/recording assembly 130 and/or processed by processing system 135. In one aspect of the invention, the digital images presented on viewing element 170 may comprise images associated with the one or more images captured by image capture devices (not shown) within recording device 130. Alternatively, the digital images presented on viewing element 170 may comprise a super-position of images associated with one or more images captured by image capture devices within recording device 130. Alternatively, the digital images presented on viewing element 170 may comprise color enhanced images (e.g., processed information) associated with images captured by the one or more image capture devices within recording assembly 130.

Figure 2:
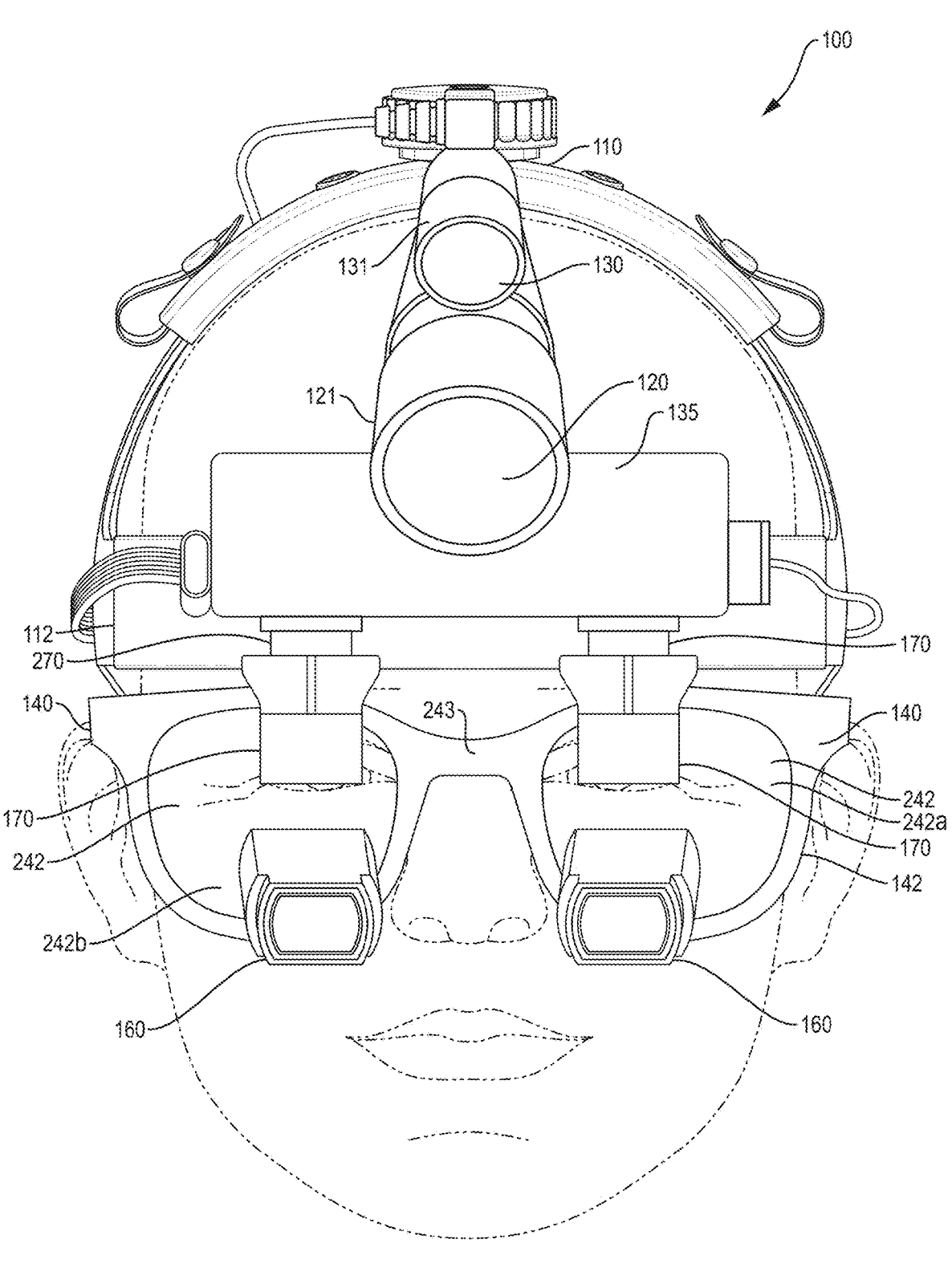
FIG. 2 illustrates a front view of the exemplary embodiment of the Multiple Light/Recording Assembly with Digital Presentation System shown in FIG. 1.

FIG. 2 illustrates a front view of the exemplary embodiment of the visualization system shown in FIG. 1.

In this illustrated view, eyewear 140 is shown comprising frame 141 containing a plurality of carrier lenses 242 (shown as left carrier lens 242a and right carrier lens 242b), joined together by bridge element 243. Further illustrated are magnification devices 160 inserted through corresponding one of left carrier lens 242a and right carrier lens 242b, wherein magnification devices 160 provide a magnified view of an object (not shown). In one aspect of the invention magnification devices 160 may comprise Galilean telescopes. In another aspect of the invention, magnification devices 160 may comprise Keplerian telescopes. Magnification devices 160 a known level of magnification based on the structure of devices 160. As the illustrated magnification devices 160 are well known in the art, a further detailed discussion of these devices is not believed needed for one skilled in the art to understand the operation of magnification devices 160.

Further illustrated is viewing devices 170, which in one aspect of the invention, may be viewed through corresponding ones of left carrier lens and right carrier lens 242. Alternatively, viewing devices 170 may be inserted through corresponding one of left carrier lens 242a and right carrier lens 242b.

Further illustrated is electrical connection 270 extending from processing element 135 to viewing device 170. Connection 270 provides means for providing electrical energy and digital images to viewing device 170.

Figure 3:
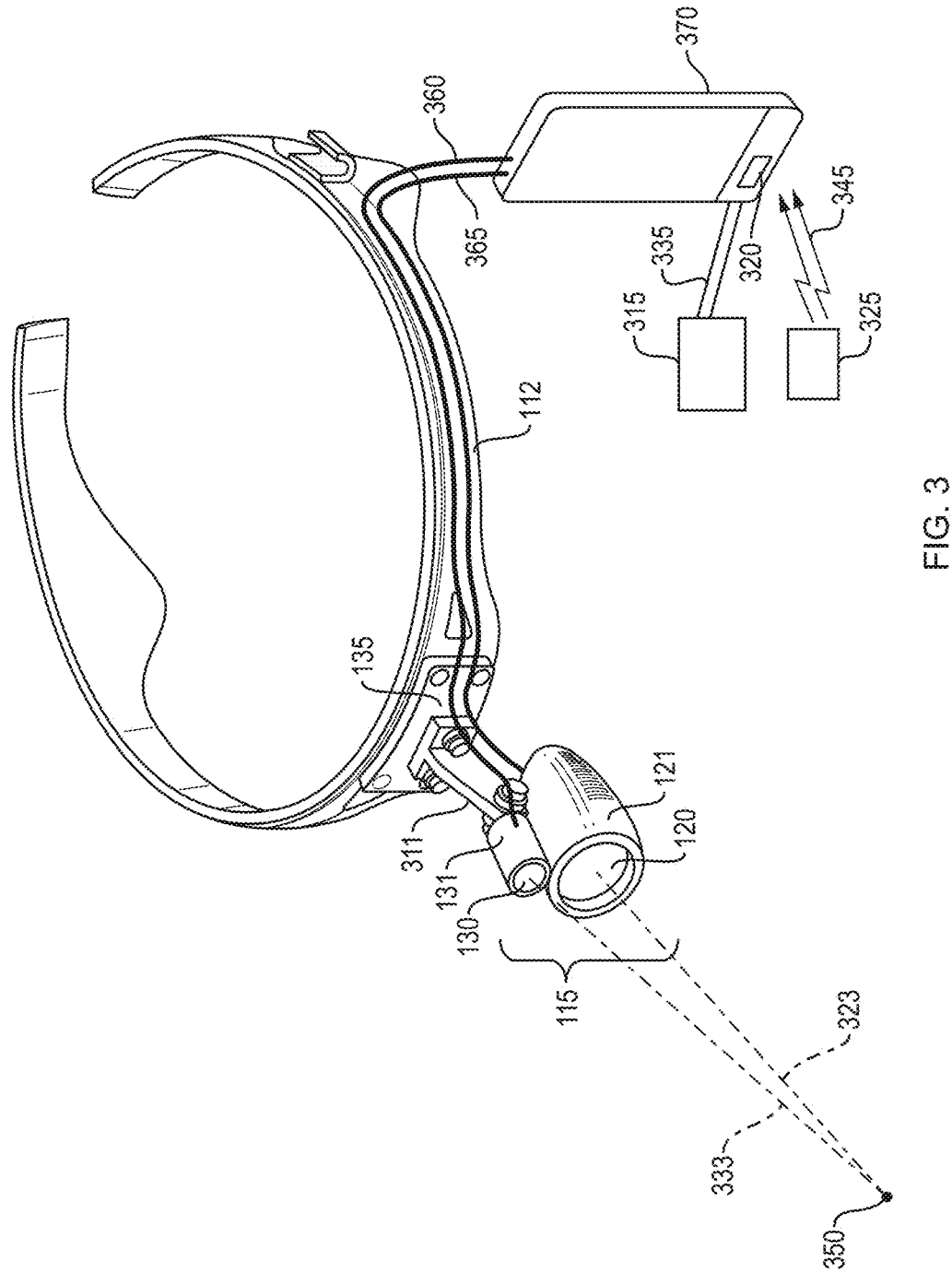
FIG. 3 illustrates a perspective view of a first exemplary embodiment of a multiple lighting/recording device in accordance with the principles of the invention.

FIG. 3 illustrates a perspective view of a first exemplary embodiment of a lighting device in accordance with the principles of the invention.

In this illustrated exemplary embodiment, lighting/recording system 115 (comprising light housing 121 containing, therein, lighting assembly 120 and an image capture/recording housing 131 containing, therein, image capture assembly 130) extends from head band 112, wherein lighting/recording system 115 comprises a single lighting assembly 120, within light housing 121, and a single image capture assembly 130 within recording housing 131 suspended from head band 112 by bracket 311.

Bracket 311 allows for the positioning of lighting/recording assembly 115 to direct light, emitted along axis 323, onto a desired common or viewing point (or region or area) 350. In addition, recording device 130 is concurrently adjusted such that images of objects positioned at common (or viewing) point 350 are viewed along axis 333.

Accordingly, a practitioner, by the adjustment of light assembly 115, may orient a viewing point 350 to be substantially co-incident to the field of view established by the magnification devices 160 (FIG. 1).

Lighting assembly 120 may be capable of generating light in at least one of a plurality of wavelength ranges, as discussed above.

Further illustrated is power controller 370 (e.g., a battery pack. AC/DC converter), remotely located from light/recording assembly 115.

Power controller 370 provides electrical energy, through electrical connectors 360, 365, to the lighting sources (not shown) within lighting assemblies 120, through processing element 135, in a manner as previously disclosed.

Further illustrated are switches 315 and 325, which are illustrated as being remote from power controller 370, wherein switches 315 and 325 determine which of the one or more lighting sources (not shown) within lighting assembly 120 emit light in at least one of the previously discussed wavelength bands. Switch 315 may represent a single function switch that is in wired communication with power controller 370, as represented by wired connections 335, to alter the state of the emitted light. In one aspect of the invention, switch 315 may, for example, be attached to a collar, a shirt, a belt, etc., that may be operated by the touch of switch 315 (e.g., by a hand, by an elbow). For example, switch 315 may represent a bellows switch attached to a belt that may be operated by depression of the bellows by an elbow. Alternatively, switch 315 may be operated by the detection of the proximity of an object (e.g., a hand, an elbow) to switch 315. In one aspect of the invention, switch 315 may be a foot switch, which is placed on the floor near a practitioner's foot to change the state of light emitted. Alternatively, switch 315 may be a multi-functional that may be used to cause different ones of the one or more lighting sources within lighting assembly 120 to be activated and emit light. In still another aspect, multi-functional switch 315 may be used to change a combination of light sources to be activated and/or the intensity of the light to be output.

Switch 325 may represent a single functional (or a multi-functional) switch that is in wireless communication with power controller 370, which allows for the alteration of the state of the emitted light emitted by lighting assembly 120, in a manner as discussed with regard to switch 315.

Switches 315 and 325 may be in communication with power controller 370 through interface 320. Interface 320 may represent a conventional wired interface (RS 232, USB-A, USB-c, etc.), for example. Alternatively, interface 320 may represent a conventional wireless communication interface (BLUETOOTH, Wi-Fi using one or more of IEEE 811 protocols, etc.).

Switches 315 and 325 may represent at least one of: a physical switch, a contact switch and a contactless switch. For example, switch 315 may represent a contact-type switch control that utilizes a physical switch or a capacitive touch (e.g., a touch of a contact point that alters a capacitance) to alter the output of light from corresponding ones of lighting assembly 120. For example, switch 315 (or 325) may change the state of one or more of lighting sources within lighting assembly 120 by the contact of a finger, a hand, an elbow or foot pressed against, or coming in proximity to switch 315 (325). For example, switch 315 (325) may enable lighting source 120 to emit different combinations of light (e.g., white only, white/colored, colored only, IR, etc.) with sequential actions on switch 315 (325).

Alternatively, switch 315 (325) may represent contactless switch control for the application of a voltage (or current) to be applied to lighting 120.

For example, a non-contact control of the voltage (or current) applied to lighting assembly 120 may be achieved by the occurrence of a detection of a reflection of a signal, such as an infra-red, or an ultra-sonic, signal, that may be transmitted through a transmitter (not shown) and which is reflected by an object (e.g., a hand) passing through the transmitted signal. A reflection of the transmitted signal may be detected by a receiver (or a detector, not shown). The receiver or detector may then generate an indication of the reflected signal to power controller 370 to apply a voltage to, or remove a voltage from, lighting assembly 120.

In still another example, a capacitive non-contact switch may be used to apply a voltage or current to lighting assembly 120. For example, an electrostatic field may be established around switch 315 (325) and an alteration of the electrostatic field (by an object passing through the electrostatic field) may then generate an indication of the alteration of the field to apply or remove the voltage to or from lighting assembly 120.

Contactless switch 315 (325) may be local to the power controller 370 or remote from power controller 370, as illustrated above.

In one aspect of the invention switch 315 (325), may be positioned within power controller 370, wherein power controller 370 may be placed on a belt or on a floor (e.g., a foot switch), which is responsive to the engagement (i.e., contact or proximity) of switch 315 (325) to provide electrical energy from power controller 370 to lighting assembly 120.

Figure 4:
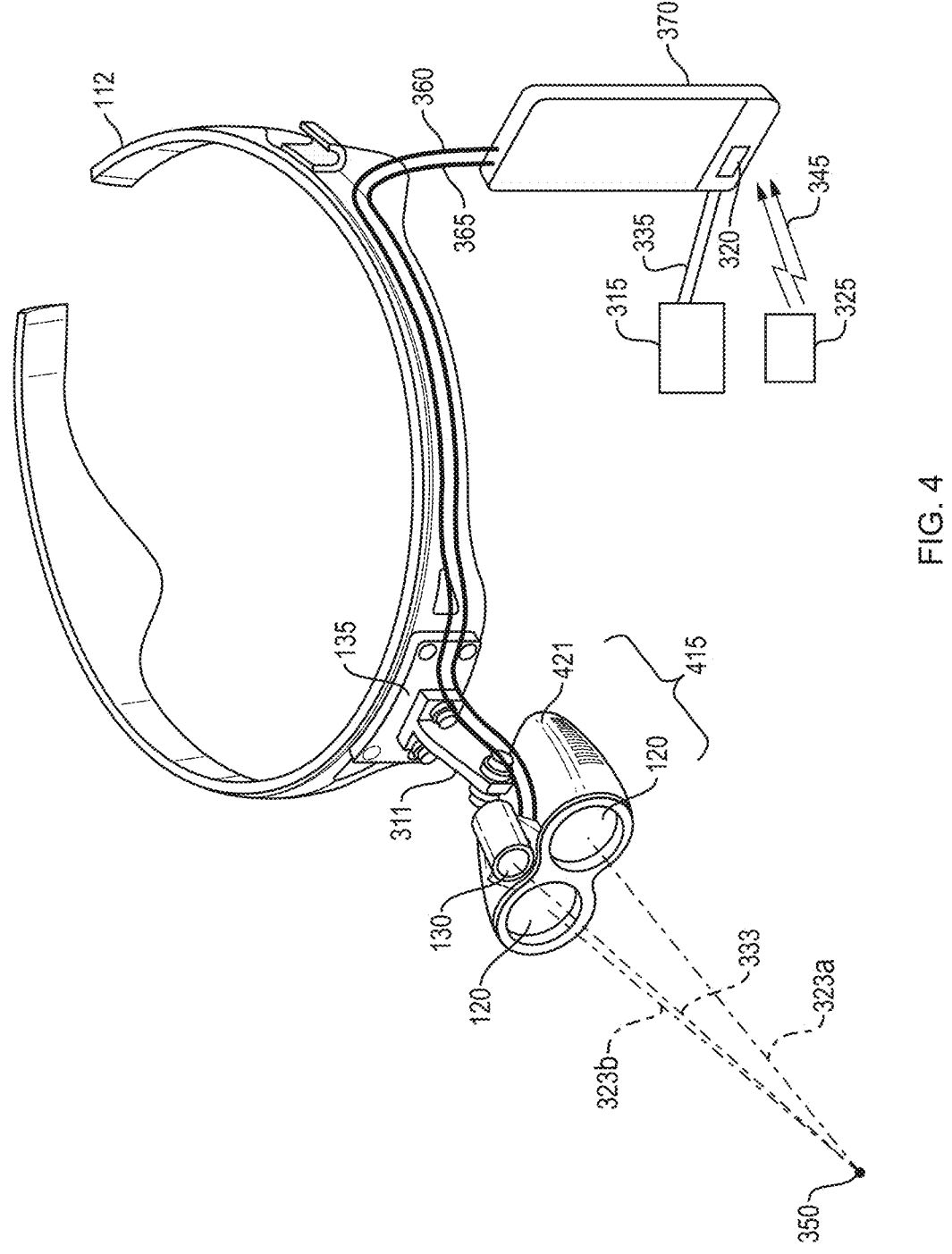
FIG. 4 illustrates a perspective view of a second exemplary embodiment of a multiple lighting/recording device in accordance with the principles of the invention.

FIG. 4 illustrates a perspective view of a second exemplary embodiment of a multiple lighting/recording device in accordance with the principles of the invention.

In this illustrated exemplary second embodiment, lighting/recording system 415 (comprising dual lighting assemblies 120 within light assembly 421 and image capture assembly 130 within housing 131) extends from head band 112 by bracket 311, in a manner as previously discussed.

Each of the two lighting assemblies 120 may be capable of generating light in at least one of a plurality of the wavelength ranges along corresponding ones of optical axis 323 (presented as 323a, 323b, respectively), as previously discussed. Further illustrated is power controller 370 (e.g., a battery pack), remotely located from light assembly 415, which provides electrical energy to the lighting sources (not shown) within the two lighting assemblies 120.

Further illustrated are switches 315 and 325, which operate in a manner as discussed with regard to FIG. 3.

Figure 5:
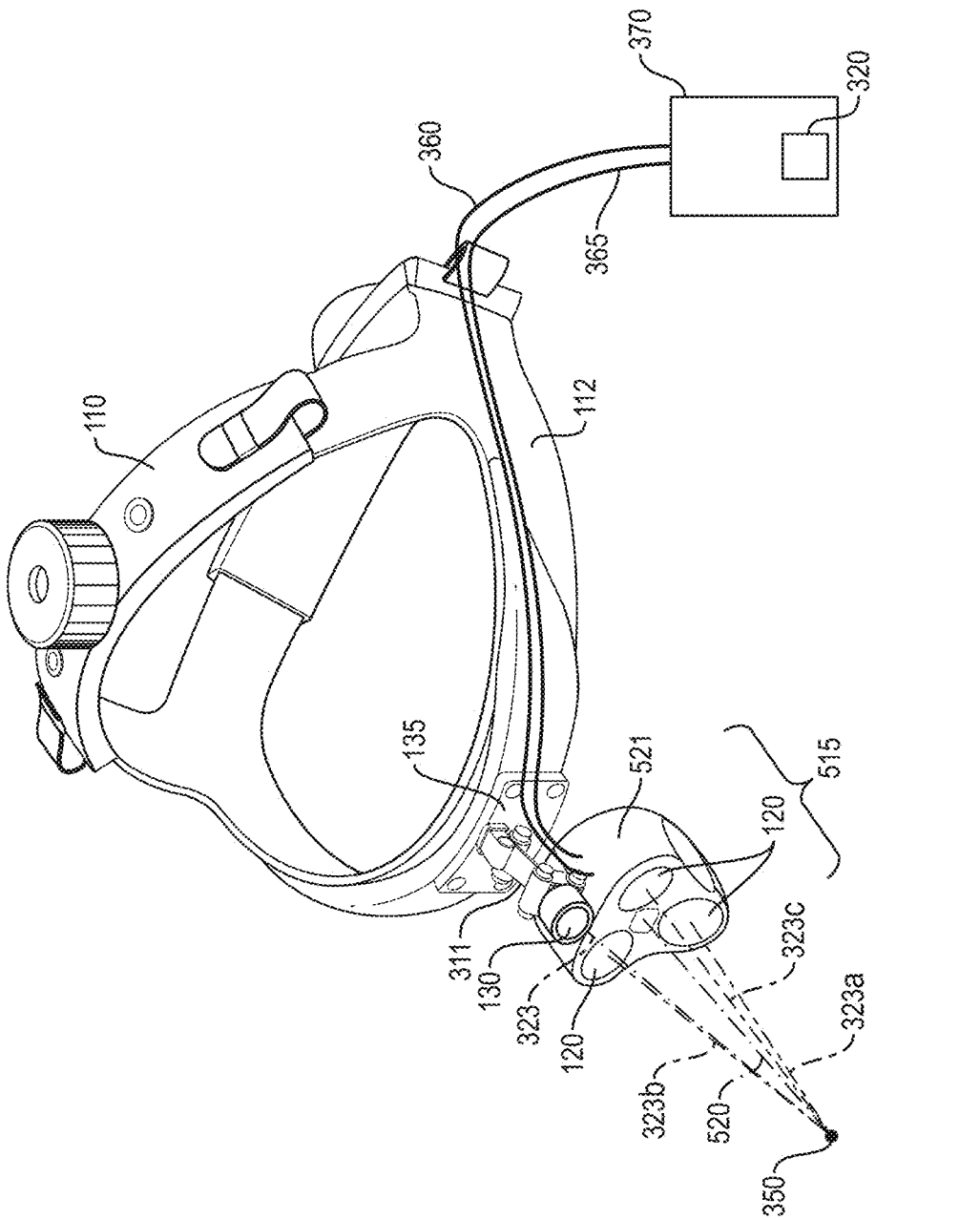
FIG. 5 illustrates a perspective view of a third exemplary embodiment of a multiple lighting device in accordance with the principles of the invention.

FIG. 5 illustrates a perspective view of a third exemplary embodiment of a lighting/recording system in accordance with the principles of the invention.

In this exemplary embodiment, lighting/recording system 515 (comprising a plurality of lighting assemblies 120 within light housing 521 and image capture assembly 130 within housing 131) extends from head band 110 by backed 311, wherein the plurality of lighting assemblies 120 are concentrically arranged about a central (or center) axis 520 extending substantially orthogonal to a plane of housing 521.

Lighting assemblies 120 are further illustrated as being oriented at an angle with respect to central axis 520, wherein the angle of orientation of each of lighting assemblies 120 is such that the light emitted along a respective optical axis 323 (represented as 323a, 323b and 323c), of corresponding ones of lighting assemblies 120, converge on a same point 350 (i.e., viewing point) along central axis 520.

Lighting assemblies 120 may be configured to output light independently of each other or in combination with one or more of the other lighting assemblies 120. Accordingly, the light emitted from lighting assemblies 120, may be mixed together at the point of convergence 350 along central axis 520. Or may be individually emitted such that light from one lighting assembly 120 is presented at point of convergence 350.

The light emitted by lighting assemblies 120 may, for example, be one of a white light, an ultra-violet light, an infra-red light or a visible light in one or more visible light bands (referred to as colored light). For example, one or more lighting assemblies 120 may emit light in an ultra-violet wavelength or an infra-red wavelength band and/or a visible wavelength band.

In one aspect of the invention, a first lighting assembly 120 may emit a white light and each of the remaining lighting assemblies 120 may emit a light at a same wavelength. In another aspect of the invention, a first lighting assembly 120 may emit a white light and each of the remaining lighting assemblies 120 may emit light in a same wavelength band. In still another aspect of the invention, a first lighting assembly 120 may emit a white light and each of the remaining lighting assemblies 120 may emit light in an infra-red wavelength band. In still another aspect of the invention, the intensity of the light emitted by lighting assemblies 120 may be varied when light is concurrently emitted from the lighting assemblies.

Further illustrated is power controller 370. Power control 370 may include a power source (i.e., a battery, an AC/DC converter) that provides power to the lighting assemblies 120 through one or more electrically conductive elements 360, 365, as previously discussed.

Although not shown, it would be recognized by those skilled in the art that one or more of switches 315, 325 may be utilized to control the light emitted by the plurality of lighting assemblies 120 within housing 521.

Figure 6:
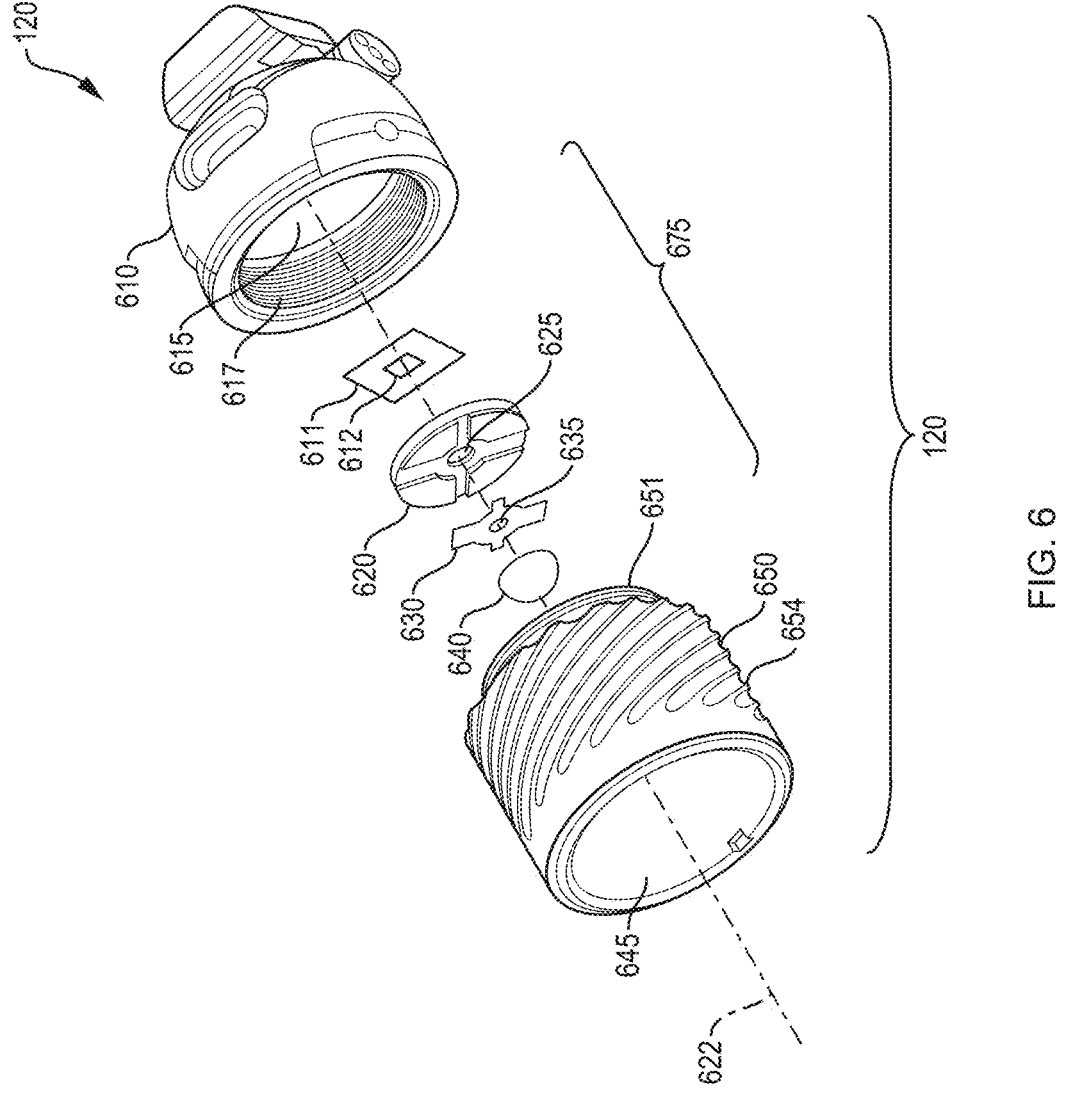
FIG. 6 illustrates a first exemplary embodiment of a lighting assembly incorporated into the lighting devices shown in FIGS. 3-5.

FIG. 6 illustrates an exploded perspective view of a first exemplary embodiment of a lighting assembly incorporated into light assemblies 120 shown in FIGS. 3-5.

In this exemplary embodiment, lighting assembly 120 comprises a housing 610 including, therein, a lighting source 612, substantially centered on a printed circuit board (PCB) 611 retained on base 615 within housing 610. As would be known in the art, lighting source 612 may comprise a single light source or an array of light sources (light emitting diodes) arranged to emit light. Lighting source(s) 612 may represent a light emitting diode that may be of a laser or non-lasing variety.

Printed circuit board (PCB) 611 includes electrical/electronic components and/or circuitry similar to that previously discussed, that controls the operation of lighting source 612 (e.g., turn on/off, change intensity).

In one aspect of the invention, lighting assembly 120 may include aperture holder (or plate) 620 and aperture 630, including substantially centered aperture holder passthrough 625 and aperture passthrough 635, respectively, through which light from lighting source 612 may pass. Aperture holder passthrough 625 and aperture passthrough 635 are sized to provide for a reduction of stray light emanating from lighting source 612.

Although aperture holder passthrough 625 and aperture passthrough 635 are shown as comprising a circular form, it would be understood that aperture holder passthrough 625 and aperture passthrough 635 may be in a square or rectangular form, or a combination thereof, without altering the scope of the invention. In one aspect or the invention, the circular, the square or the rectangular form of passthroughs 625, 635 may be sized such that the die portion of a semiconductor light emitting diode forming light source 612 may be inserted into at least one of aperture holder passthrough 625 and aperture passthrough 635.

Further illustrated is a dome lens 640, substantially centered over the passthroughs 625, 635, wherein the lighting source 612 is positioned within or at a focal point of dome lens 640. Dome lens 640 provides for the focusing of the light generated by lighting source 612.

Further discussion of the invention shall hereinafter make reference to the lighting source 675 as being a combination of PCB 611, lighting source 612 and one or more of aperture holder 625, aperture 635 and dome lens 640.

Lighting assembly 120 further includes lens housing 650, which is attachable to housing 610 and used to retain the lighting source 675 within housing 610. Objective lens 645 defines an optical axis 622 along which light emitted by lighting source 675 passes through lighting assembly 120. As would be understood in the art, optical axis 622 is comparable to axis 323 shown in FIGS. 3-5.

In this illustrated embodiment, housing 610 further includes an internal screw thread 617, that mates to a corresponding screw thread 651 on lens housing 650 to enable housing 610 and lens housing 650 to be rendered as a single unit.

Although a screw thread is illustrated, it would be recognized that housing 610 and lens housing 650 may be joined by other means. For example, a bayonet connection, a snap-fit connection, a form fit connection and other similar connections.

Further shown, on lens housing 650, are grooves 654 circumventing lens housing 650. Grooves 654, which is an optional feature of lens housing 650, provide for an increased surface area to distribute heat generated within lighting assembly 120.

In accordance with the principles of the invention, lighting source 612 is positioned within a focal length of the objective lens 645 when lens housing 650 is joined to housing 610. The positioning of light source 612 within the focal lengths of dome lens 640 and lens 645 provides for a more even distribution of light. See for example, U.S. Pat. Nos. 7,690,806 and 10,247,384 for further details regarding obtaining a substantially uniform light distribution.

Figure 7A:
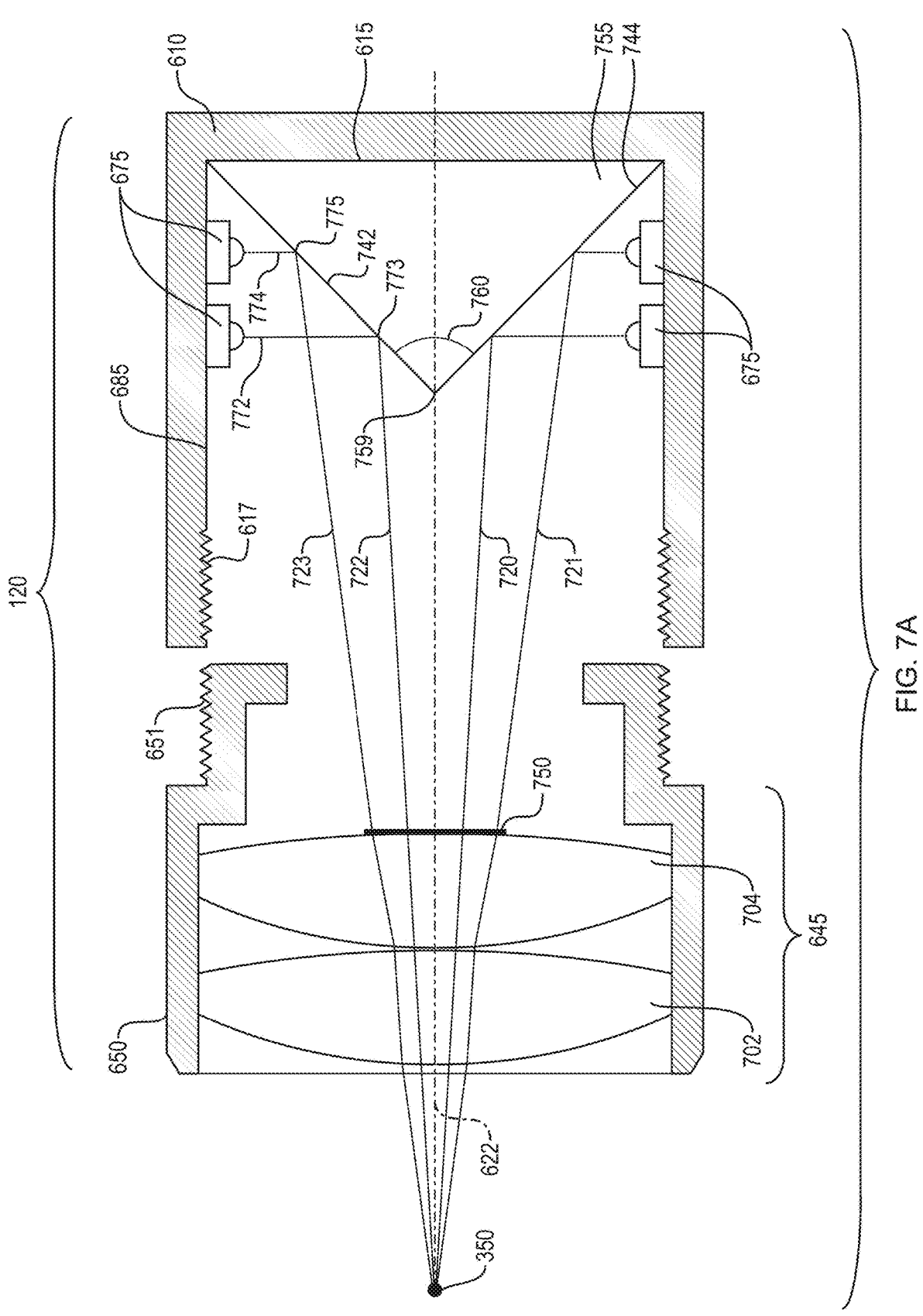
FIGS. 7A and 7B illustrate first and second aspects of a second exemplary embodiment of a lighting assembly incorporated into the lighting devices shown in FIG. 3-5.
Figure 7B:
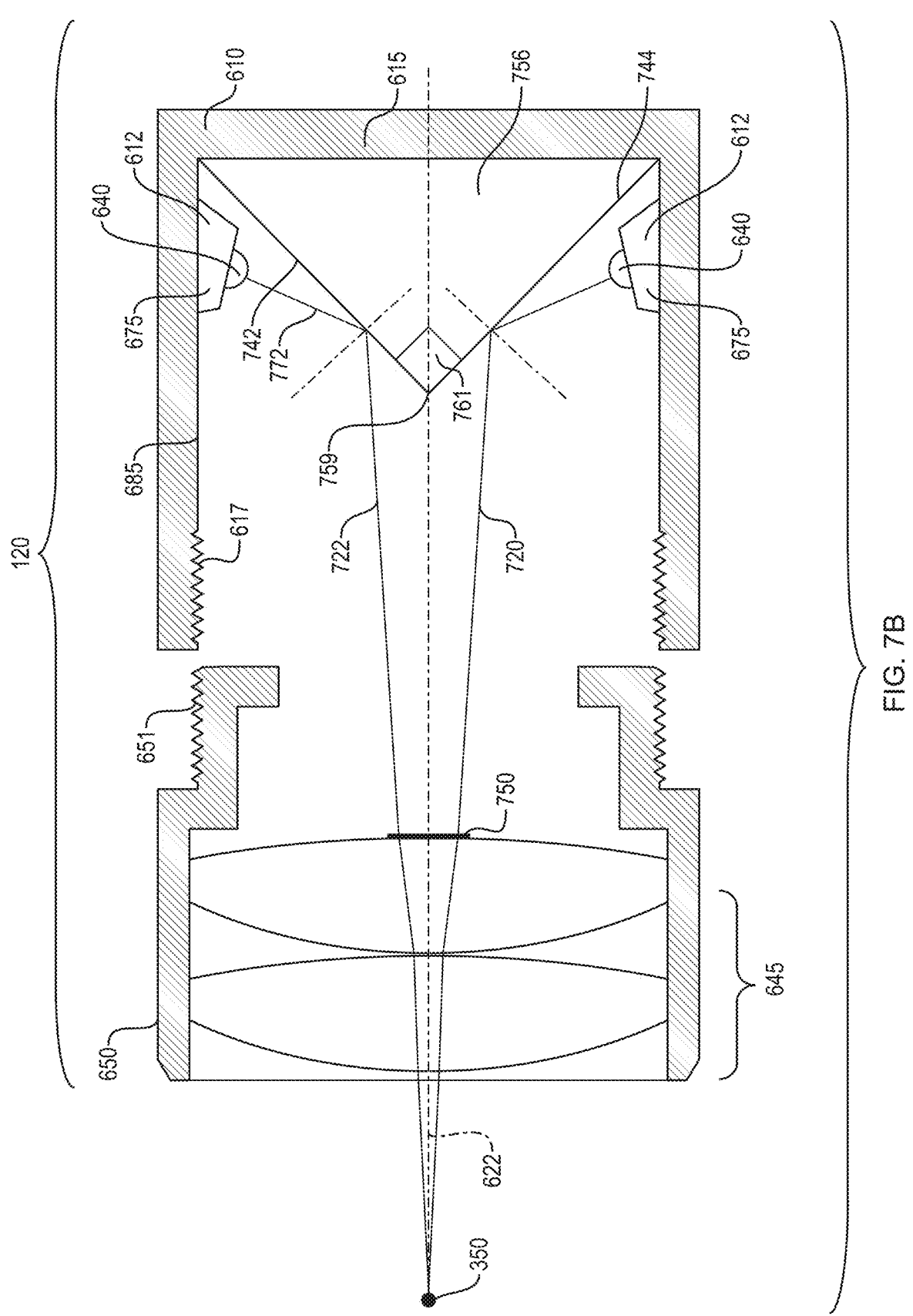

FIGS. 7A and 7B illustrate a first and a second aspect of a second exemplary embodiment of a lighting assembly incorporated into the lighting devices shown in FIG. 3-5.

FIG. 7A illustrates a side view of a first aspect of a second exemplary embodiment of a lighting assembly incorporated into light assemblies shown in FIGS. 3-5.

In this first aspect of lighting assembly 120, lighting assembly 120 comprises lens housing 650 containing objective lens 645 (which in this illustrated example comprises objective lens 702 and 704) and housing 610 comprising at least one of a plurality of lighting sources 675 arranged about an inner circumference 685 of housing 610. Objective lens 645 defines an optical axis 622 along which light emitted by lighting source 675 passes through lighting assembly 120.

As previously discussed, lighting sources 675 in a preferred embodiment includes lighting source 612, aperture 620, aperture holder 630 and dome lens 640, it would be recognized that lighting sources 675 may comprise lighting source 612 and lack one or more of aperture 620, aperture holder 630, and dome lens 640, without altering the scope of in the invention claimed.

In accordance with this exemplary first aspect of lighting assembly 120, the illustrated lighting sources 675 are oriented about an inner circumference 685 of housing 610 wherein light emitted by lighting sources 612a, 612b is directed toward light director 755, which extends from a base 615 of housing 610.

In this illustrated aspect, light director 755 comprises a pyramid or prismatic structure comprises a plurality of reflective surfaces (i.e., highly polished, mirror, etc.) 742, 744 arranged at an angle to each other such that a peak angle 760 is formed at an apex 759 of reflective surfaces 742, 744. The reflective surfaces 742, 744, receive light emitted by corresponding ones of light sources 675 and redirects the received light towards an area 750 about optical axis 622, wherein the optical characteristics of objective lens 645 directs the light received within region 750 toward common point 350.

Although two reflective surfaces are illustrated it would be recognized by those skilled in the art that the prismatic structure 755 may comprise three, four or more reflective surfaces joined together at apex 759, as would be known in the art.

In accordance with the aspect of the illustrated exemplary embodiment, lighting sources 675 are positioned at different locations along the inner circumference 685 of housing 610, such that light emitted by a first lighting source 675 is projected along light path 772 and contacts light director 755 at a first point 773 and light emitted by a second lighting source 675 is projected along light path 774 and contacts light director 755 at a second point 775. The light from lighting sources the first and second lighting sources 675 is then directed, along axis 722 and 723, respectively, toward area 750 on objective lens 645. Light sources 675 similarly emit light, which is redirected along axis 720 and 721 toward region 750.

In this illustrated aspect of the invention, apex angle 760 is shown to be greater than ninety (90) degrees as the orientation of light sources 675 is substantially orthogonal to axis 622. Apex angle 760 may be, in part, determined based on the orientation of lighting sources 675 with respect to axis 622, the characteristics of lens 645, and the distance to common point 350.

Although reference is made to lighting source 675, which includes PCB 611, as shown in FIG. 6, it would be understood by those skilled in the art that a single PCB 611 may be utilized to control the application of electrical energy to the illustrated lighting sources 675.

FIG. 7B illustrates a side view of a second aspect of a second exemplary embodiment of a lighting assembly incorporated into light assemblies shown in FIGS. 3-5.

In this illustrated second aspect, light director 756 comprises a pyramid or prismatic structure comprising a plurality of reflective surfaces (i.e., highly polished, mirror, etc.) 742, 744 joined together at a peak angle 761 extending from a base 615 of housing 610, wherein the apex angle 761 of light director 756 is substantially ninety (90) degrees.

In accordance with this illustrated second aspect of the illustrated embodiment, lighting sources 675 (i.e., lens 630, light source 612) is oriented offset from a perpendicular axis with respect to axis 622, such that light emitted by lighting source 675 and reflected by reflecting surface 742, 744 is directed toward region 750 on objective lens 645. The light directed toward region 750, after passing through lens 645, converges onto an area about common point 350, in a manner similar to that previously discussed. In this aspect of the invention, the orientation of lighting sources 675, with respect to axis 622 is based, in part, on the characteristics of lens 645 and a distance to common point 350.

Figure 8A:
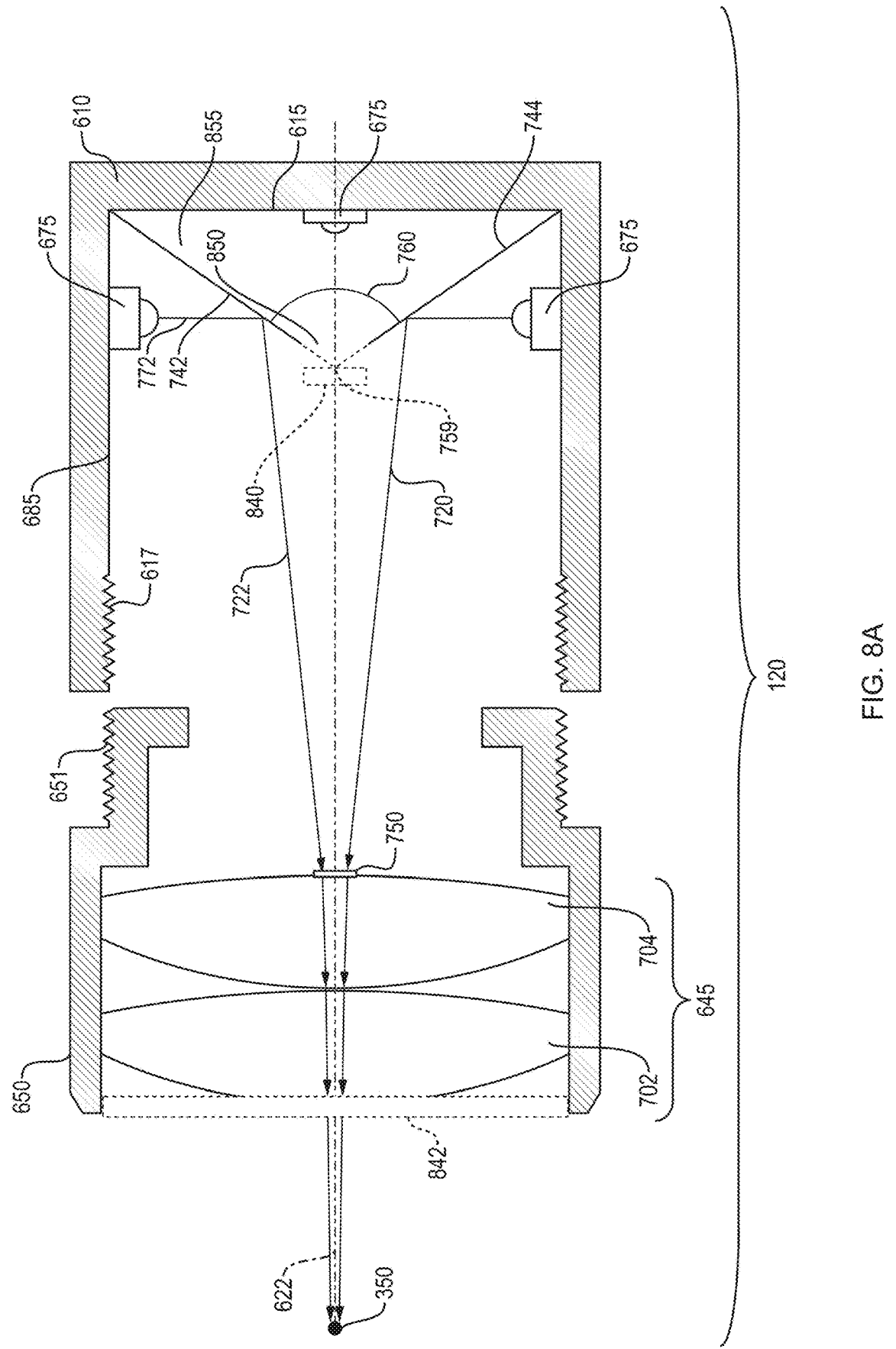
FIGS. 8A and 8B illustrate first and second aspects of a third exemplary embodiment of the lighting assembly shown in FIGS. 3-5.
Figure 8B:
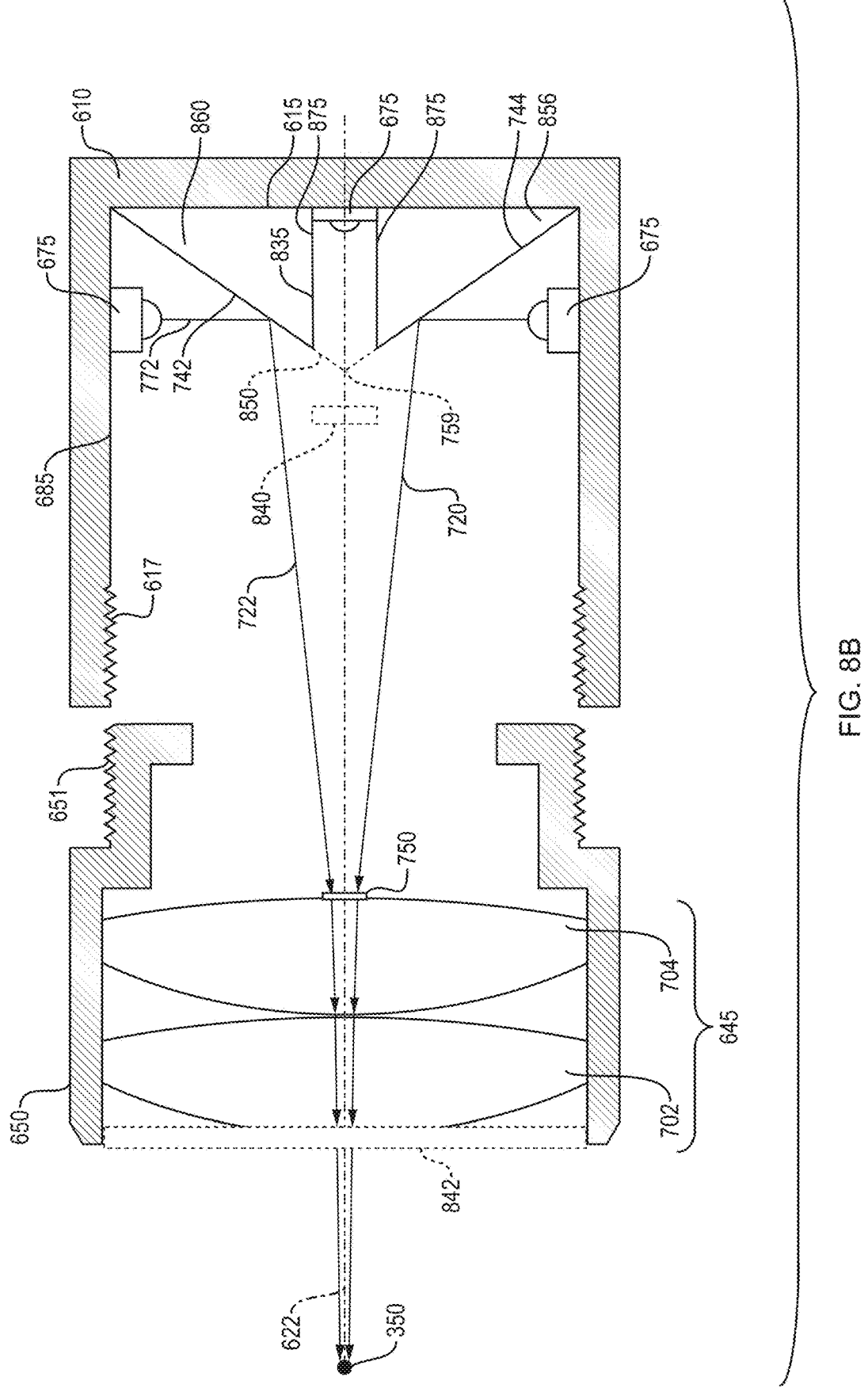

FIGS. 8A and 8B illustrate a first and a second aspect of a third exemplary embodiment of the lighting assembly shown in FIGS. 3-5.

FIG. 8A illustrates a side view of a first aspect of a third exemplary embodiment of a lighting assembly incorporated into light assemblies shown in FIGS. 3-5.

In this illustrated embodiment, which is similar to the embodiment shown in FIG. 7A, lighting assembly 120 comprises housing 610 and lens assembly 650, which comprises objective lens 645 (i.e., lenses 702, 704). Lens assembly and housing 610 are joined by corresponding mating elements 651 and 617.

Further illustrated is light director 855 extending from base 615. In this illustrated aspect, light director 855 comprises reflective surfaces 742, 744 arranged, with respect to base 615, to form angle 760760 similar to angle 760 shown in FIG. 7A (i.e., greater than ninety (90) degrees).

In this illustrated aspect of the invention, reflective surfaces 743, 744 are not joined at the apex 759, as previously discussed. Rather, a gap 850 is formed at the apex 759 of reflective surfaces 742, 744.

Similar to FIG. 7A, lighting source(s) 675 (only a single lighting source 675 being shown) is formed on an inner surface 685 of housing 610, wherein light emitted by lighting sources 675 is directed toward corresponding reflective surfaces 742, 744 and re-directed, along axis 722, 720, toward region 750 on objective lens 645.

Further illustrated is lighting source 675 positioned on base 615, wherein light emitted by lighting source 675 is directed along axis 622 toward lens 645 and subsequently toward viewing point 350.

According to this aspect of a lighting assembly, light from different ones of lighting sources 675 may be directed toward an object (not shown) positioned at common point 350. In one aspect of the invention, each of lighting sources 675 may emit a same light to increase an intensity of light at point 350. Alternatively, light sources 675 may emit light in different wavelength ranges.

In one aspect of the invention, one or more filters 840, 842 may be incorporated into the lighting assembly 120. Filters 840, 842 may be utilized to limit the wavelength range of light emitted by lighting sources 675. For example, filter 840 may be configured to limit the light emitted by lighting assembly 120 to a defined wavelength range (i.e., a passband filter). Alternatively, filter 840 (842) may be configured to limit the light emitted by lighting assembly 120 to be greater (i.e., high pass filter) or less than (i.e., low pass filter) than a known wavelength.

Although filters 840, 842 are discussed with regard to the configuration shown in FIG. 8A, if would be recognized that filters 840, 842 may be utilized for each of the lighting assemblies shown in FIGS. 6, 7A, 7B, 8A and 8B.

FIG. 8B illustrates a side view of a second aspect of a third exemplary embodiment of a lighting assembly incorporated into light assemblies shown in FIGS. 3-5.

In this illustrated embodiment, light director 856 comprises a prismatic element extending from base 615 of housing 610, similar to the light director 8755 discussed with regard to FIG. 8A. Further illustrated is tunnel 850 extending from an apex 759 of prism 856 to base 615 of housing 610, wherein lighting source 675 is positioned at a base end of tunnel 850. Further illustrated are lighting sources 675 positioned along an inner circumference 685 of housing 610, as previously discussed.

In one aspect, sides 875 of tunnel 850 may comprise highly reflective surfaces, such that light emitted by lighting source 675 is directed through tunnel 850.

As previously discussed, light emitted by the lighting source(s) 675 is directed toward region 750 wherein the light emitted by lighting sources 675 is directed, through objective lens 645, toward viewing point 350.

Figure 9A:
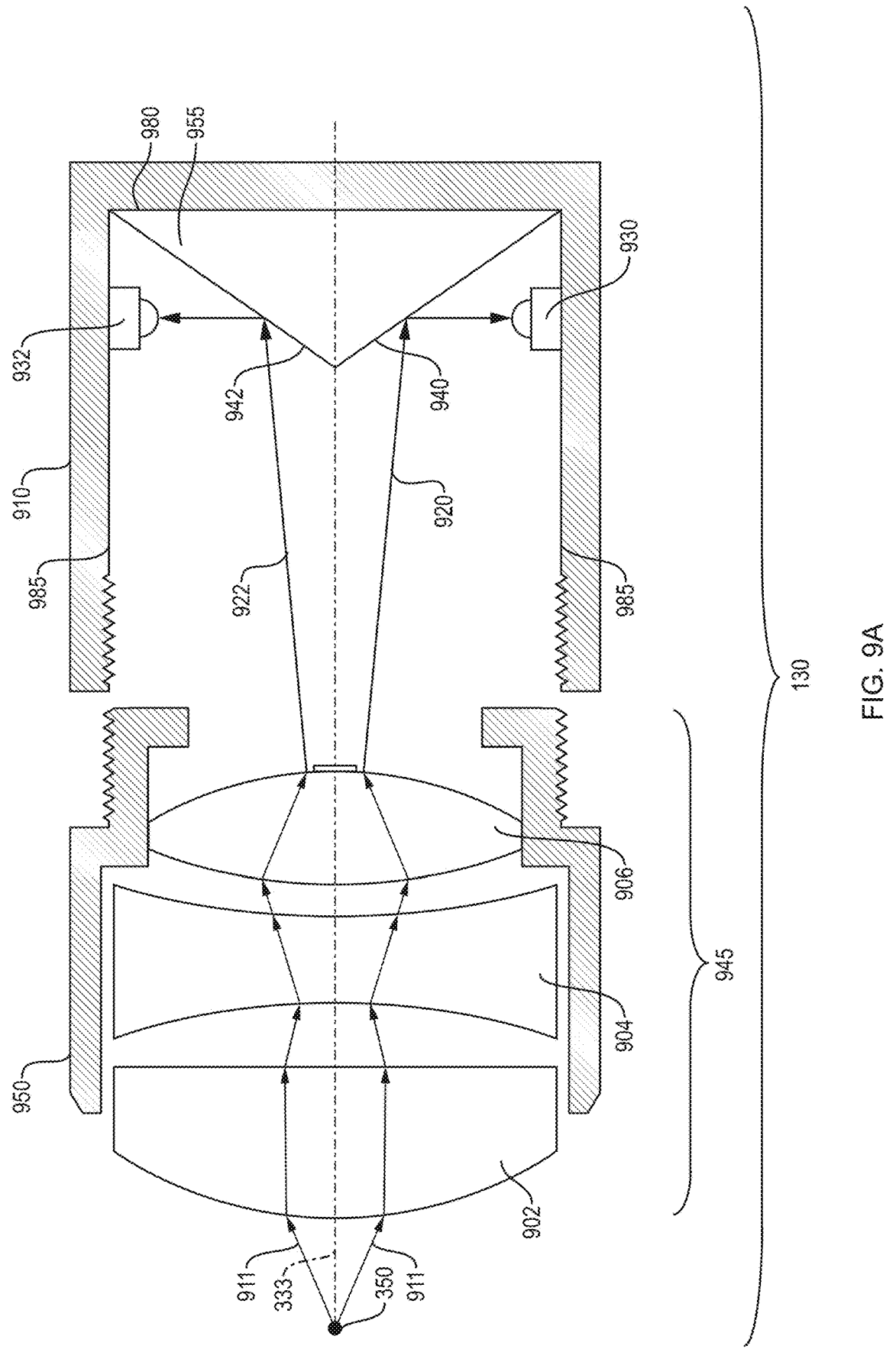
FIG. 9A illustrates a first exemplary embodiment of an image capture assembly in accordance with the principles of the invention.

FIG. 9A illustrates a first exemplary embodiment of an image capture assembly in accordance with the principles of the invention.

In this exemplary embodiment, image capture assembly 130 comprises housing 910 and a lens housing 950, wherein housing 910 is comparable to housing 610 and lens housing 950, is comparable to lens housing 650, wherein housing 910 and lens housing 950 are removable attachable.

In one aspect of this first exemplary embodiment of image capture assembly 130, prismatic configuration 955 is positioned on a base 980 of housing 950, in a manner similar to the prismatic structure 755 shown in FIGS. 7A, 7B. In another aspect of this first exemplary embodiment of image capture assembly 130, prismatic configuration 955 may be comparable to the reflective surface structure shown in FIGS. 8A, 8B.

In this aspect of the invention, housing 950 includes lens configuration 945, which receives light 911 emitted by, or reflected from, an object (not shown) positioned along axis 333 at viewing point 350 (See FIG. 3). The received light 911, passing through lens assembly 945 proceeds along light path 920, 922, after appropriate focusing, toward reflective surfaces 940, 942 of structure 955. Light 911 reflected from surfaces 940, 942 is directed to image capture devices 930, 932, respectively, positioned along an inner circumference 985 of housing 910.

In one aspect of the invention, image capture devices 930, 932 may comprise digital cameras (i.e., CCD or CMOS devices with integrated lens elements for focusing) or CCD/CMOS devices with separate focusing lens that capture light associated with objects (not shown) in a same wavelength band (e.g., visible light wavelength band). Alternatively, image capture devices 930, 932 may comprise digital cameras (or CCD, CMOS chips or sensors) that capture light in different wavelength bands. For example, device 930 may be selected to capture images associated with objects (not shown) in a visible wavelength band (e.g., white light) and device 932 may be selected to capture images associated with objects in a non-visible wavelength range (e.g., an infra-red, ultra-violet).

In this illustrated aspect of the invention, lens configuration 945 comprises a plurality of lens 902, 904, 906, that used to direct and focus the received light 911 such that light 911 travels along light paths 920, 922 so to be properly reflected by surfaces 940, 942 and captured by devices 930, 932, respectively.

The captured images may be provided to processing unit 135 (FIG. 1), wherein the captured images may be presented to a user on display units 170.

In one aspect of the invention, a user may select which of a plurality of information may be presented on display units 170. For example, images captured with a white light image capture device (e.g., device 930) may be presented on display units 170.

Alternatively, images captured with image capture device 930 operating in a non-visible wavelength range (e.g., infra-red) may be presented on display units 170. In still another alternative aspect, images associated with an image capture device 930 operating in a non-visible light wavelength range (e.g., infra-red, ultra-violet) may be merged onto images associated with a visible light camera 932 to present a color enhanced IR image.

Figure 9B:
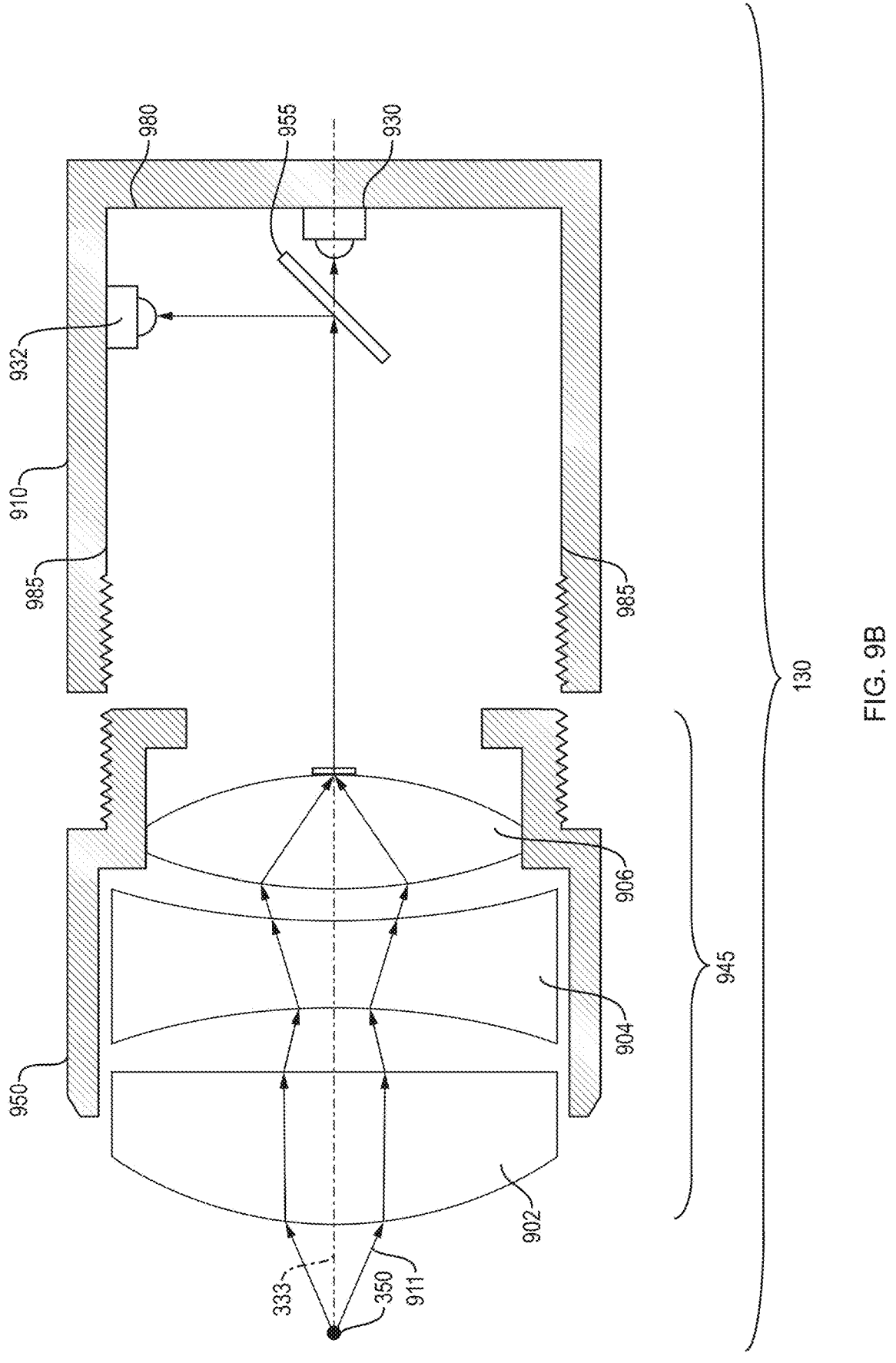
FIG. 9B illustrates a second exemplary embodiment of an image capture assembly in accordance with the principles of the invention.

FIG. 9B illustrates a second exemplary embodiment of an image capture assembly in accordance with the principles of the invention. In this second exemplary embodiment, image capture assembly 130 comprises housing 910 and lens assembly 950 similar to that described with regard to FIG. 9A. Further illustrated is prismatic structure 956 comprising a plurality of reflective surfaces 940, 942 arranged at an angle with respect to base 980, wherein the reflective surfaces 940, 942 are separated by a gap 957 at an apex of reflective surfaces 940, 942.

In accordance with this embodiment of the invention, an image capture device (e.g., 932) is positioned along an inner circumference 985 of housing 910 and a second image capture device (e.g., 930) is positioned on base 980 wherein light associated with an image of an object (not shown) travels along at least optical paths 920, 923 to be captured by corresponding ones of image capture device 930, 932.

Figure 10:
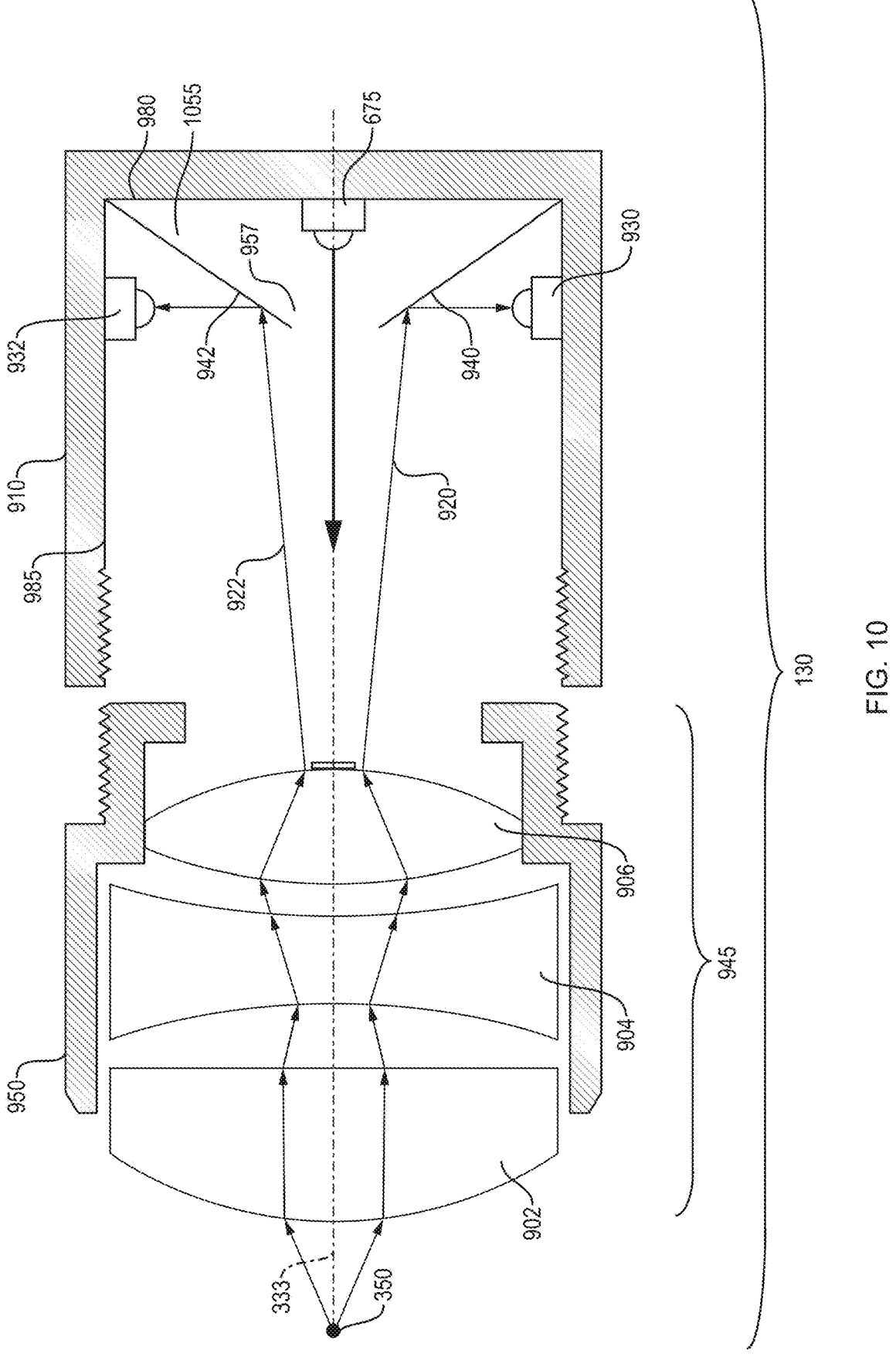
FIG. 10 illustrates a first exemplary embodiment of a combined lighting/image capture assembly in accordance with the principles of the invention.

FIG. 10 illustrates a first exemplary embodiment of a combined lighting/image capture assembly in accordance with the principles of the invention.

In this exemplary embodiment, similar to that shown in FIG. 9B, housing 910 includes a prismatic structure 1055 comprises a plurality of reflective surfaces 940, 942 similar to structure 956 shown in FIG. 9A, which includes gap 957 located at an apex of prismatic structure 1055. In this illustrated embodiment, image capture devices 930, 932 are shown positioned on an inner circumference 985 of housing 910 in a manner similar to that discussed with regard to FIGS. 9A and 9B, wherein light received emitted, or reflected, by an object (not shown) at viewing point 350 is reflected toward image capture devices 930, 932 as discussed with regard to FIGS. 9A and 9B.

Further illustrated lighting source 675 positioned on base 980 of housing 910. Lighting source 675 is configured to emit light (in one or more wavelength ranges) through gap 957 toward object (not shown) along axis 333.

As previously discussed, image capture devices 920, 930 may capture images, within one or more of a visible light wavelength range (i.e., white light, non-white light), an ultra-violet wavelength range or an infra-red wavelength range.

Figure 11:
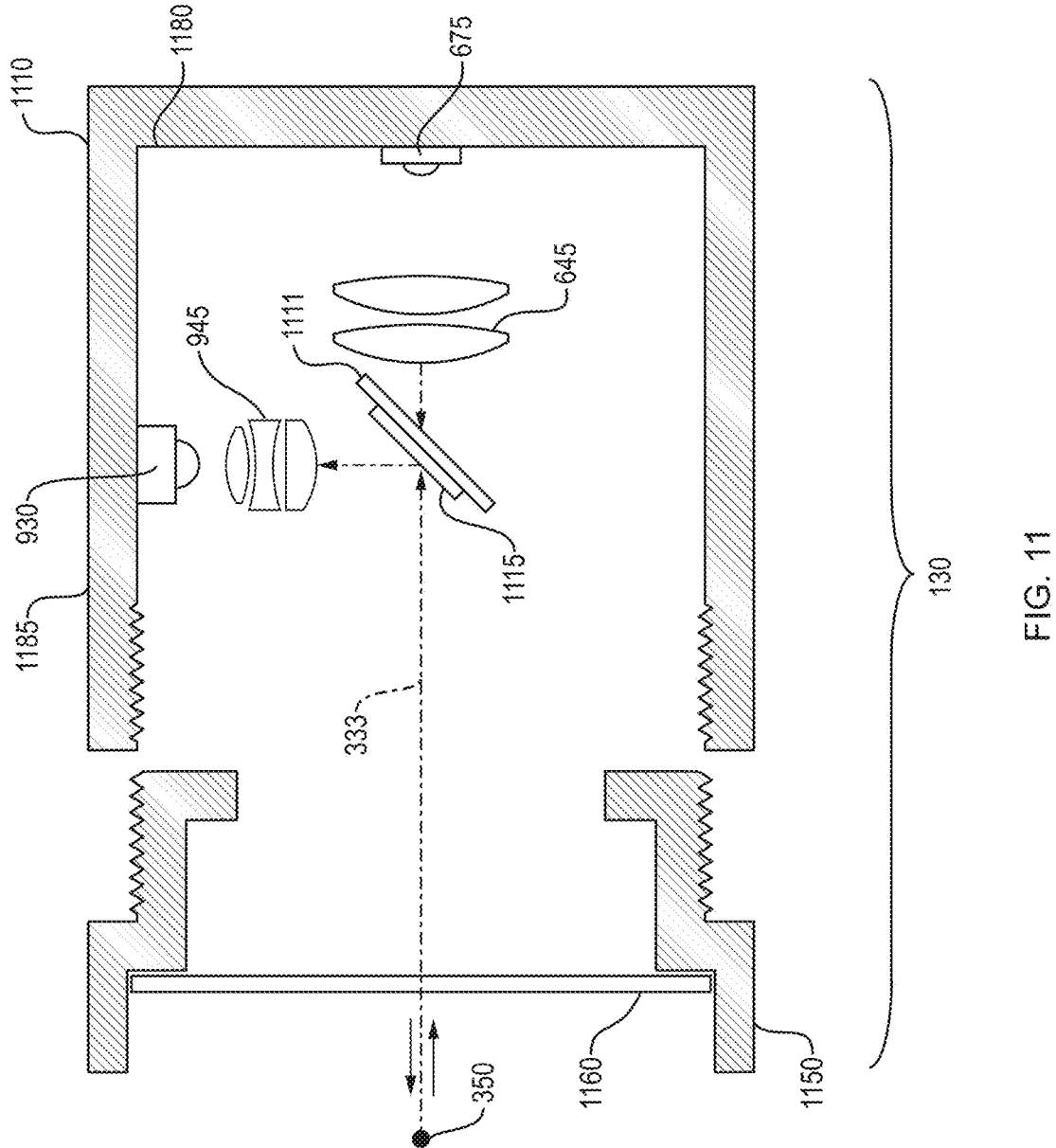
FIG. 11 illustrates a second exemplary embodiment of a combined lighting/image capture assembly in accordance with the principles of the invention.

FIG. 11 illustrates a second exemplary embodiment of a combined lighting/image capture assembly in accordance with the principles of the invention. In this exemplary embodiment combined light/image capture assembly 1130 comprised housing 1110 and lens housing 1150, which includes lens 1160. In this illustrated embodiment lens 1160 may comprise a plano lens used to seal combined light/image capture assembly 1130.

Further illustrated are image capture device 930 positioned on an inner circumference 1185 of housing 1110, wherein image capture device 930 operates to capture images in one or more wavelength ranges, (i.e., white light, non-white light, ultra-violet and/or infra-red.

Further illustrated is lighting source 675 positioned on base 1180 of housing 1110. In accordance with this embodiment of the invention, light director 1111 (e.g., block beam splitter, plate beam splitter, a film beam splitter, Pellicle beam splitter, polka dot beam splitter, etc.) is positioned and oriented, with respect to axis 333, to direct a portion of light emitted (or reflected) by an object at common point 350 to image capture device 930, for example and further allows light emitted by lighting source 675 to pass through and illuminate an object (not shown) positioned along optical axis 333. In one aspect of the invention, light director 1111 may include an optical layer (e.g., a film, coating) 1115 that may operate as a filter (e.g., a low pass) to reflect light within an infra-red wavelength range. In this aspect, image capture device 930 may represent a device that captures light, associated with an object, within an infra-red wavelength range. Alternatively, filter 11115 may reflect all light entering housing 11110 and image capture device 930 may be selected to collect light in one or more wavelength ranges. For example, infra-red light or ambient light (i.e., light within the environment surrounding an object at or near viewing point, e.g., daylight, artificial light, etc.). The captured images may be processed by a processor (not shown) and presented on to displays system 170.

In the illustrated embodiment shown, further illustrated is lens configuration 945 and lens assembly 645, wherein lens configuration is positioned to focus the light reflected by light director 1111 prior to entering image capture device 930 and lens assembly 645, which focuses the light emitted by lighting source 675 to focus the emitted light onto a common or viewing point 350.

In accordance with the principles of the invention, light emitted by lighting source 675 passes through light director 1111.

In one aspect of invention, light director 1111 may represent a dichroic mirror (or beam combiner), that reflects light impinging or shining on a first side while allowing light impinging or shining on a second side to pass through.

In accordance with this aspect of the invention, each image capture device may operate and be controlled independently, and, thus, may only be activated when a corresponding light (e.g., white light, infra-red light) is emitted by a corresponding light assembly (shown in FIGS. 3-5.

Figure 12:
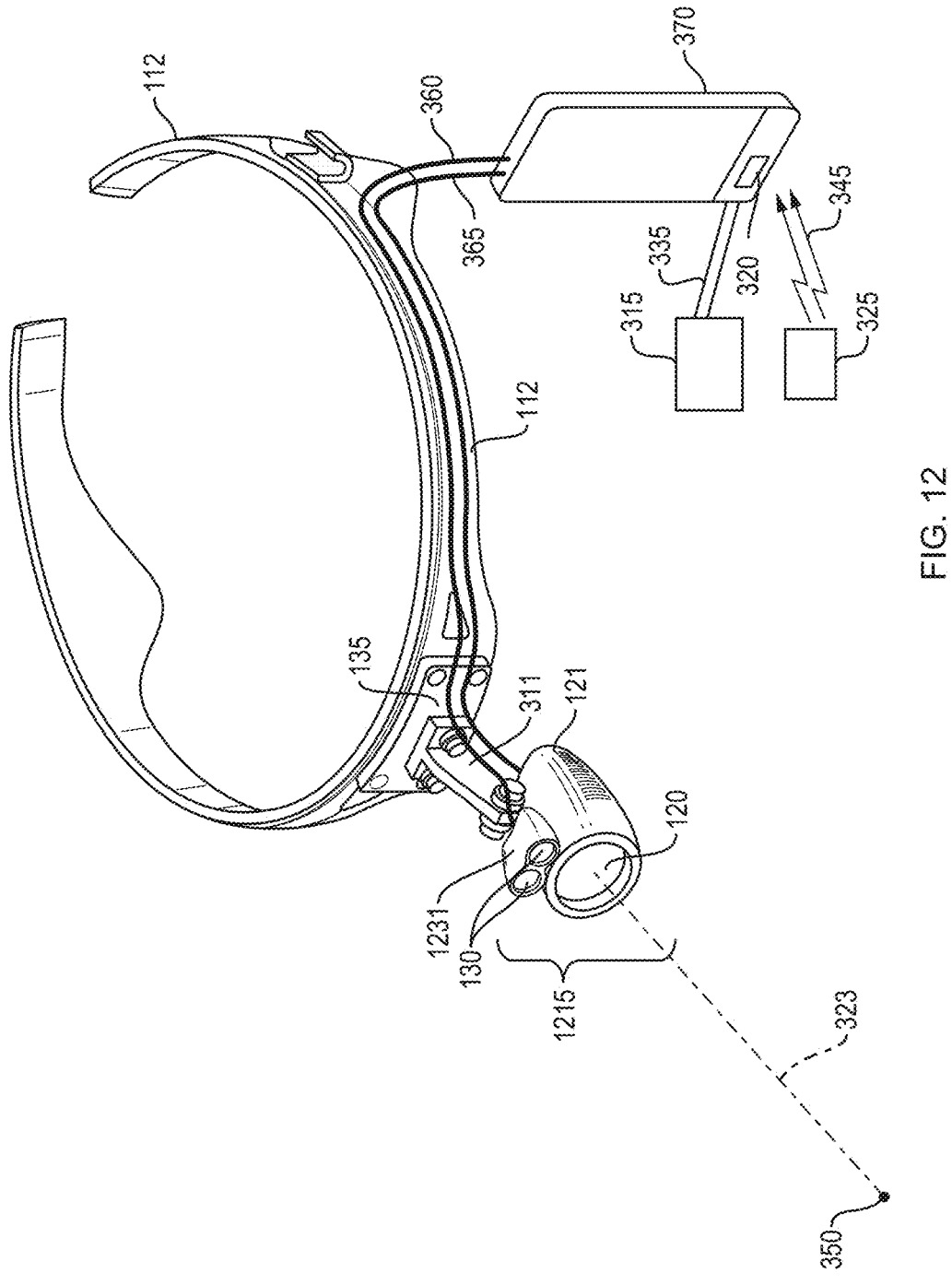
FIGS. 12-14 illustrates additional aspects of the configurations shown in FIGS. 3-4.
Figure 13:
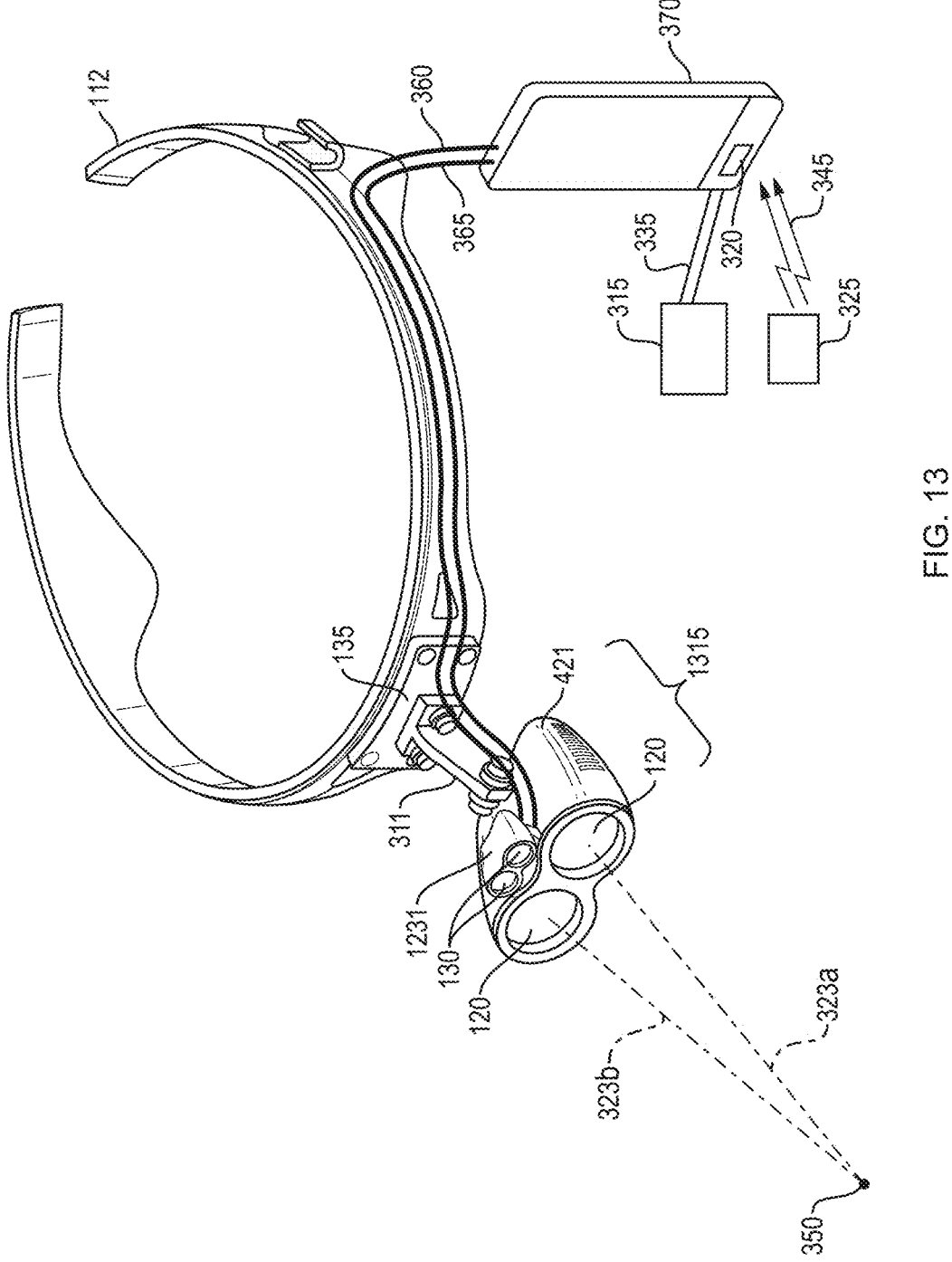
Figure 14:
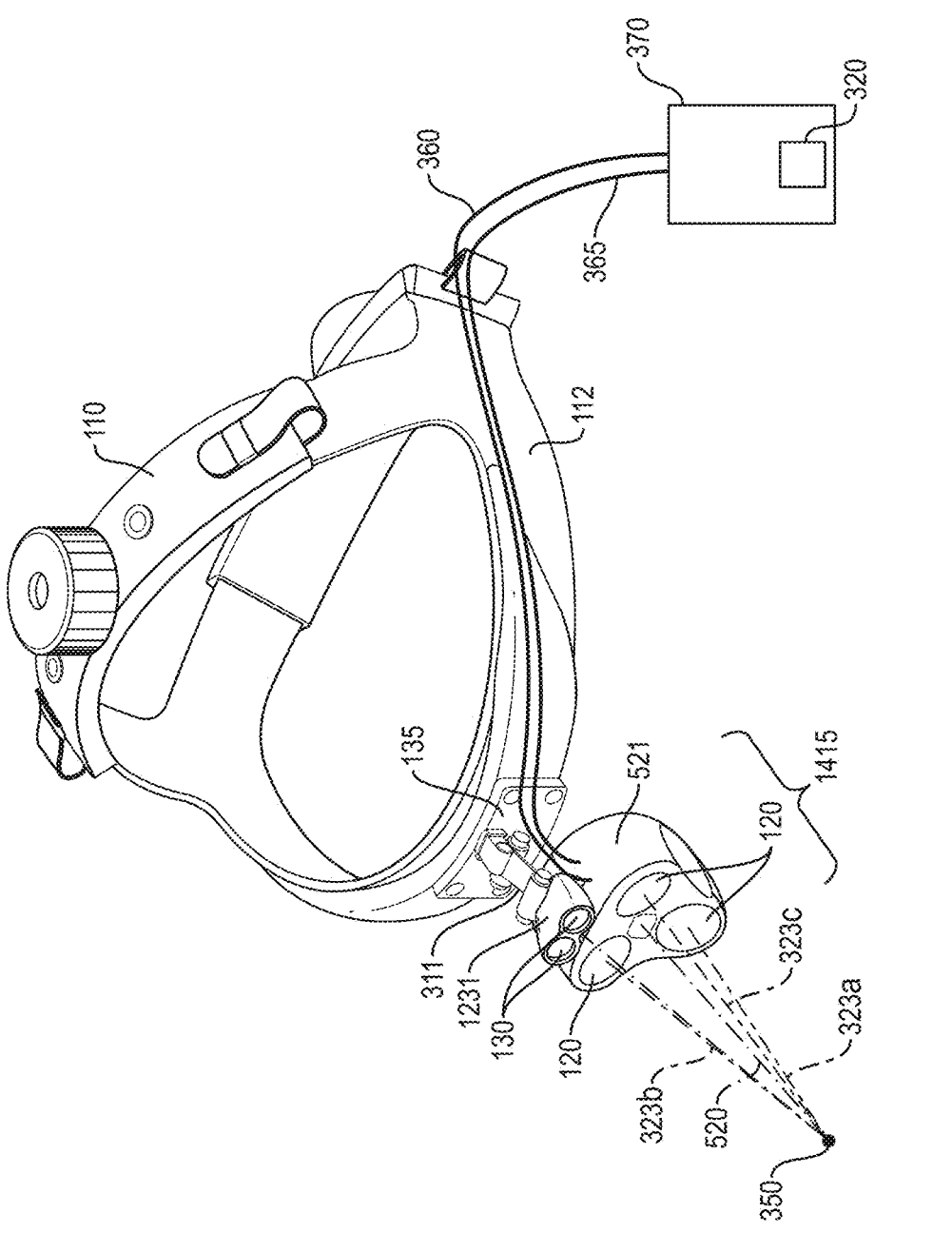

FIGS. 12-14 illustrate configurations of light/recording systems 1215, 1315 and 1415 similar to light/recording systems 115, 415 and 515, respectively shown in FIGS. 3-5, wherein recording housing 1231 provides for at least two image capture assemblies 130 that may be used to capture images. In one aspect of the invention, housing 1231 provides for the housing of a first image capture assembly 130 including device 930, for example, and a second image capture assembly 130 including device 932, for example, wherein the image capture devices 930, 932 may be positioned on a base of a corresponding assembly 130 (similar to the position of image capture device 930 shown in FIG. 9B). In accordance with this aspect of the invention, image capture device 930 may represent an image capture device suitable for capturing images within a visible light wavelength range, while image capture device 932 may represent an image capture device suitable for capturing images within a non-visible (e.g., infra-red) light wavelength range. The images captured by devices 930, 932 may be provided to processing element 135 for subsequent processing, in a manner similar to that previously discussed. In one aspect of the invention, processing system 135 may enhance the images received from at least one image capture device. In another aspect of the invention, processing system 135 processes the images received from at least one image capture device by creating a combined image, wherein the combined image represents a merging of images received from image capture devices operating in different wavelength ranges.

Figure 15:
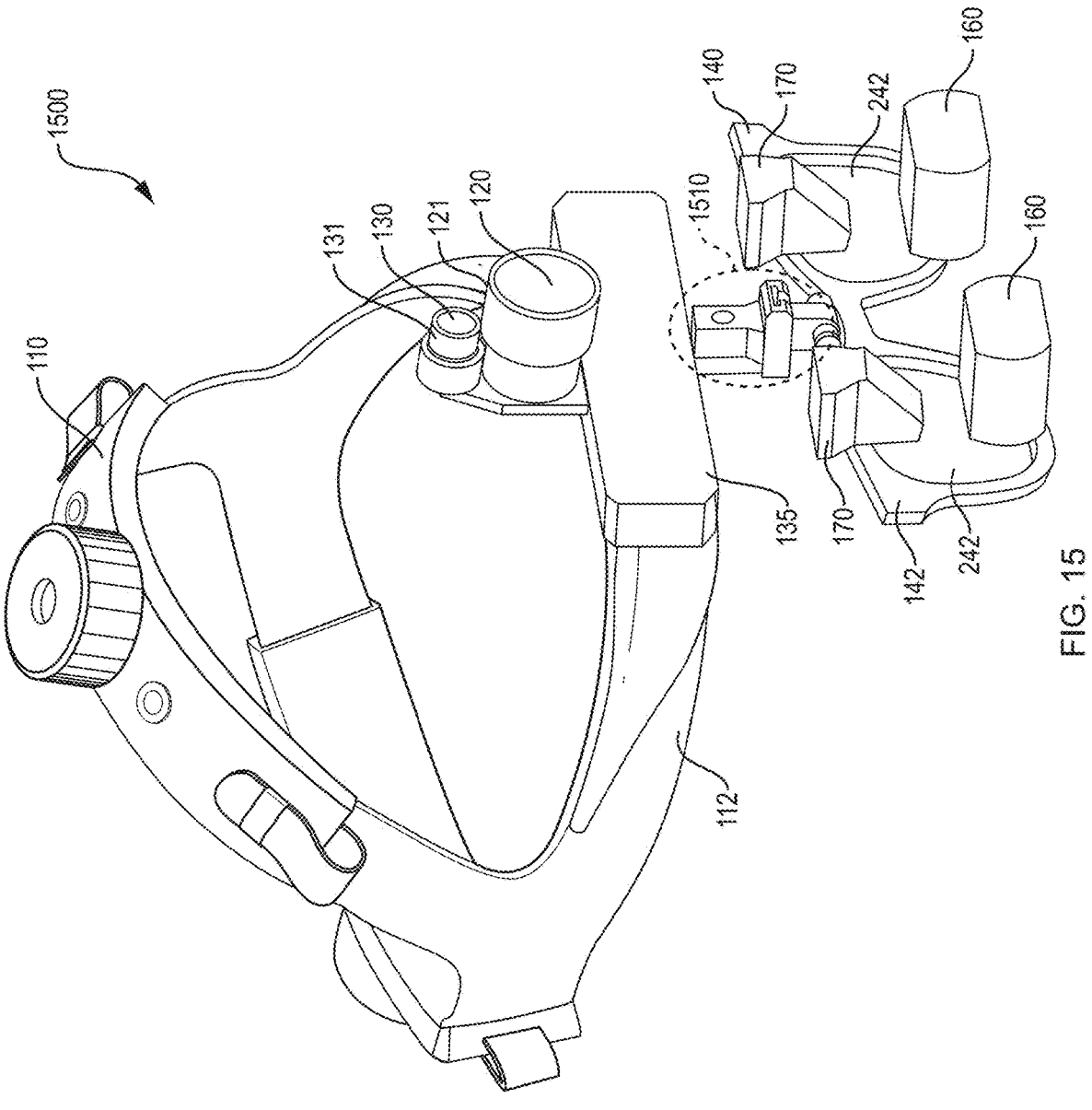
FIG. 15 illustrates a prospective view of a second exemplary embodiment of a Multiple Light/Recording Assembly with Digital Presentation System in accordance with the principles of the invention.

FIG. 15 illustrates a prospective view of a second exemplary embodiment of a Multiple Light/Recording Assembly with Digital Presentation System in accordance with the principles of the invention.

The illustrated second exemplary embodiment of a multiple light/recording assembly system comprises headband 110 to which is attached processing assembly 135 and lighting housing 121 containing lighting assembly 120 therein. Further illustrated is camera housing 131 incorporating, therein, image capture assembly 130 and eyewear 140 including frame 142, wherein frame 142 includes carrier lens 242, as previously discussed. In addition, magnification devices 160 and display system 170 are incorporated with a corresponding one of the carrier lenses 242.

In accordance with this second embodiment of the invention, eyewear 140 is further connected by processing assembly 135 (or headband 112) by multi-movement connector 1510.

Connector 1510 allows for at least one of a vertical, horizontal and rotational alignment of frame 142 with respect to processing assembly 135 and/or headband 112 so as to align the projection of light by lighting assembly 120 to the viewing point 350 (not shown) associated with magnification devices 160.

Figure 16:
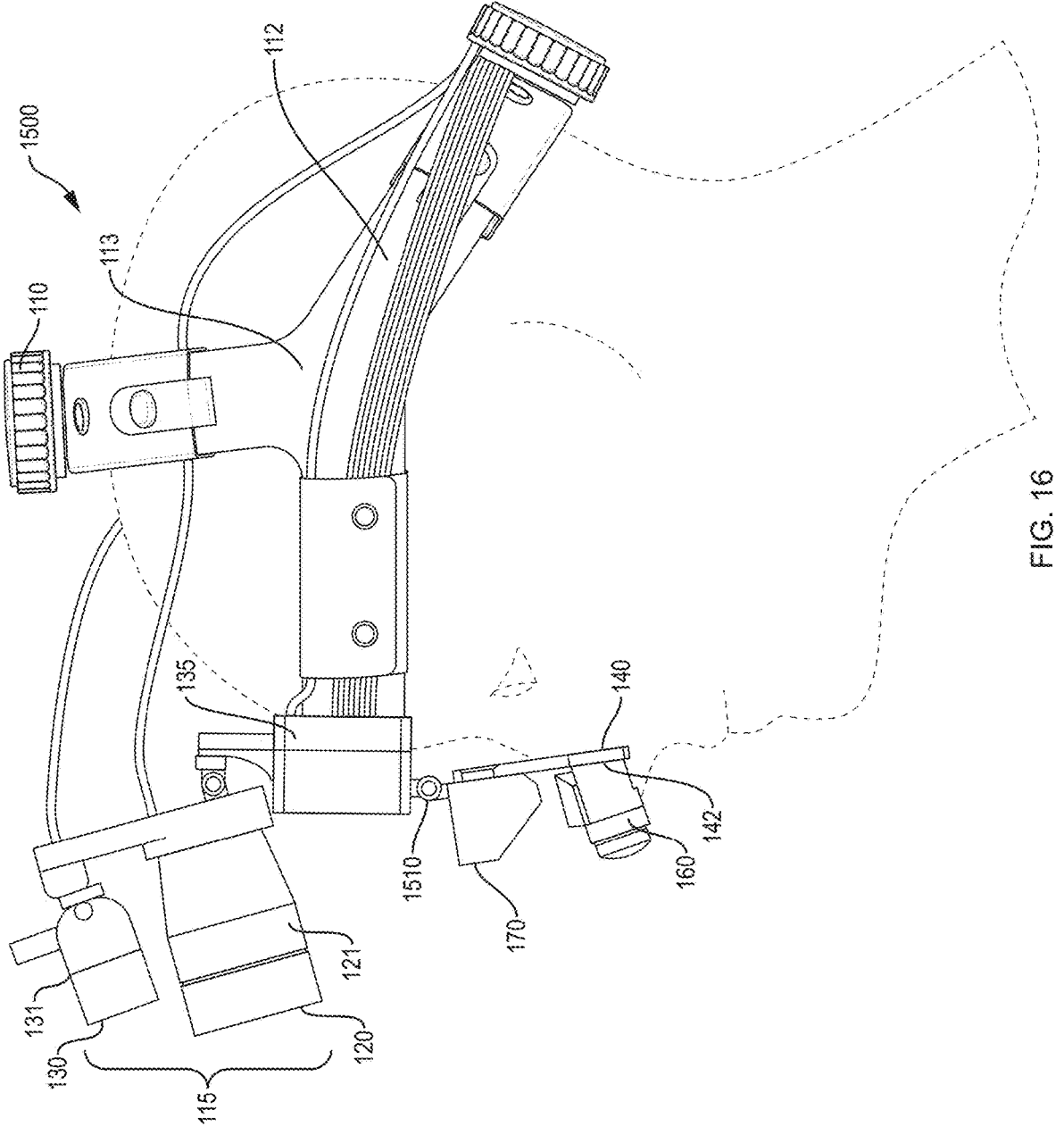
FIG. 16 illustrates a side view of the exemplary embodiment of a Multiple Light/Recording Assembly with Digital Presentation System shown in FIG. 15.

FIG. 16 illustrates a side view of the exemplary embodiment of a Multiple Light/Recording Assembly with Digital Presentation System shown in FIG. 15.

Figure 17:
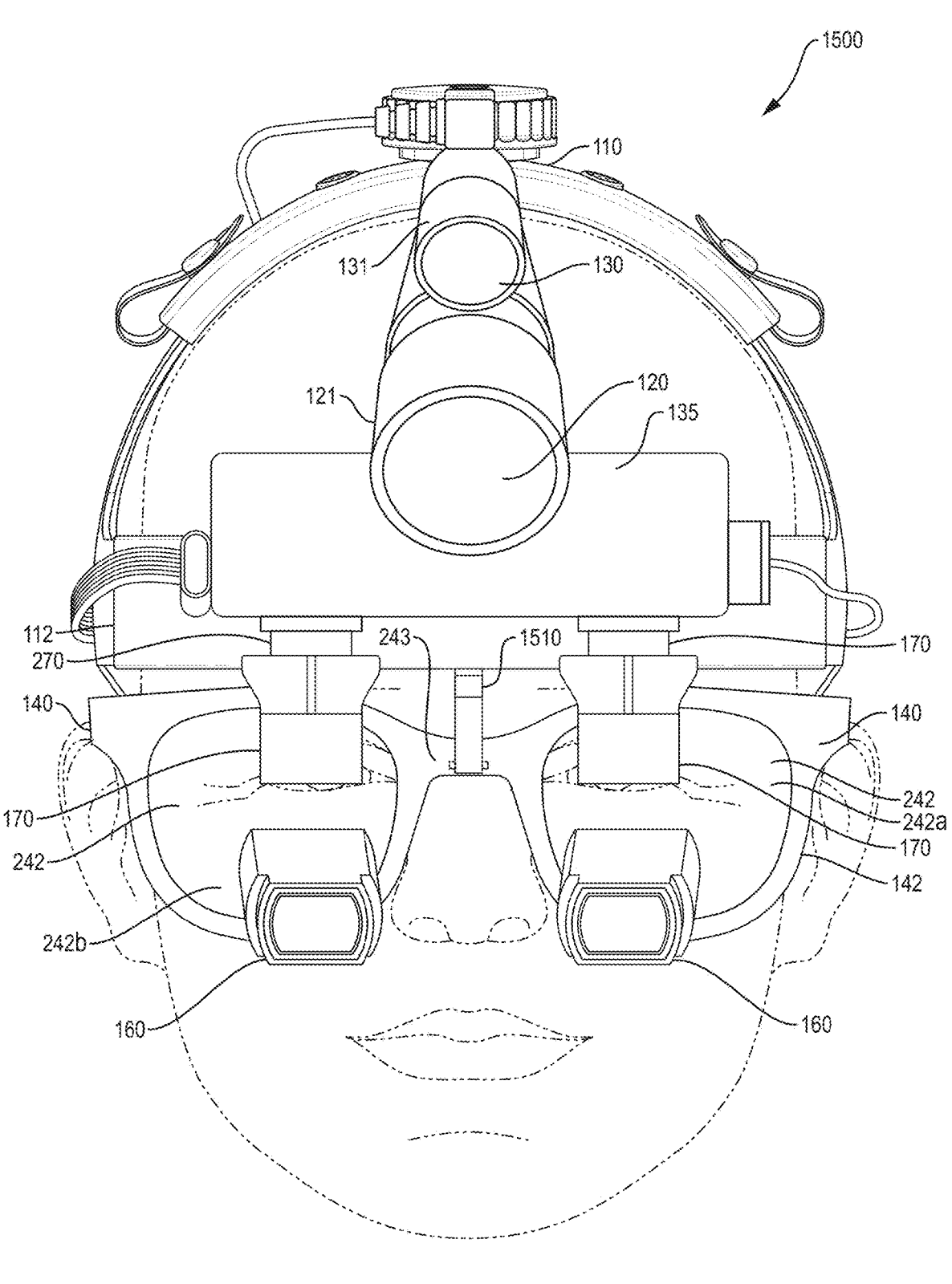
FIG. 17 illustrates a front view of the exemplary embodiment of the Multiple Light/Recording Assembly with Digital Presentation System shown in FIG. 15.

In this illustrated side view, which is similar to the system shown in FIG. 1, system 1500 includes lighting/recording system 115 including lighting assembly 120 and image capture assembly 130 attached to processing assembly 135. Further illustrated is frame 142 connected to processing assembly 135 by connector 1510. In accordance with this aspect of the invention, eyewear 140 is not connected directly to the user as the temple element 141, shown in FIG. 1, are not included. FIG. 17 illustrates a front view of the exemplary embodiment of the Multiple Light/Recording Assembly with Digital Presentation System shown in FIG. 15.

In this illustrated front view, which is similar to the configuration shown in FIG. 2, frame 142 is shown connected to processing unit 135 by connector 1510, wherein connector 1510 is attached to bridge element 243.

As FIGS. 15, 16 and 17 illustrate common elements that have been discussed in detail with regard to FIGS. 1, 2 and 3, one of ordinary skill in the art would obtain an understanding of the operation of the illustrated common elements from a reading of the operation of these elements presented with regard to FIGS. 1, 2 and 3. Accordingly, a further detailed discussion with regard to these common elements is not believed needed.

Figure 18:
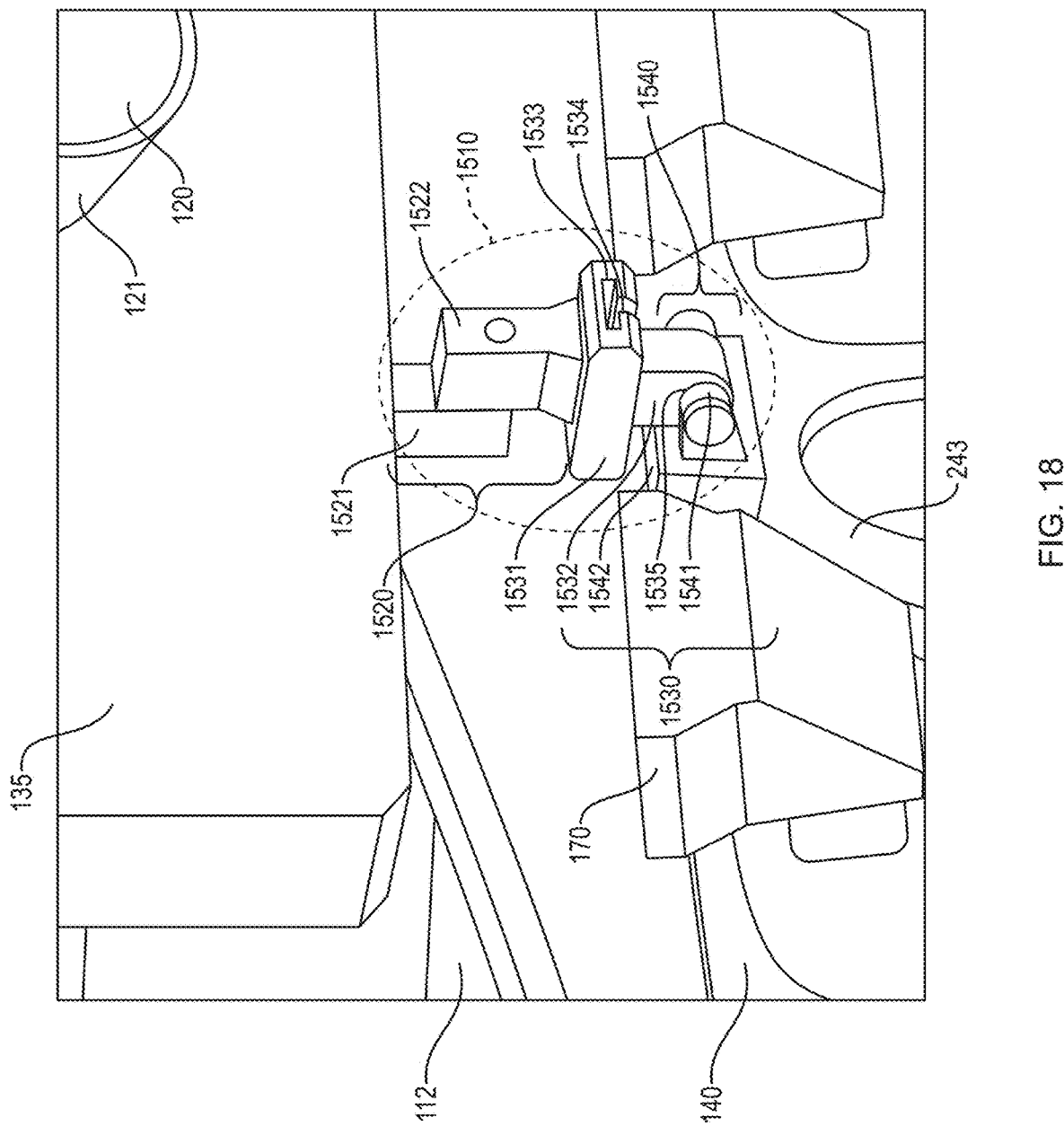
FIG. 18 illustrates a prospective view of a first aspect of a vertical alignment of the embodiment shown in FIG. 15

FIG. 18 illustrates an expanded prospective view of the multi-movement connector shown in FIG. 15

Multi-movement connector 1510, which retains frame 142 to processing assembly 135, allows for the vertical, horizontal and rotational displacement of frame 142 with respect to processing unit 135 (or headband 112).

As shown, connector 1510 comprises vertical displacement element 1520, horizontal displacement element 1530 and rotational element 1540 that allows for movement of frame 142 with respect processor assembly 135. Vertical displacement element 1520 comprises a fixed element 1521, attached to head-strap 112, and movable element 1522 attached to horizontal movement element 1530. Movable element 1522 is vertically slidable with respect to fixed element 1521, to allow for the vertical movement of frame 142 with respect to head-strap 135 (and processing element 135).

In one aspect of the invention, movable element 1522 may include a slot (not shown) that engages a protrusion (not shown) that retains movable element 1522 to fixed element 1521 while allowing movable element 1522 to vertically move with regard to fixed element 1521.

Further illustrated is horizontal movement element 1530 comprising a fixed element 1531 and movable element 1532, wherein movable element 1532 is horizontally movable with respect to fixed element 1531. In this illustrated aspect of horizontal movement element 1530, fixed element 1531 includes slot 1533 (illustrated as a T slot) into which is positioned protrusion or tab 1534. Tab 1534 is slidable within slot 1533.

Further illustrated is rotational movement element 1540, which comprises rotational element or pin 1541, insertable into an opening or passthrough 1535 within horizontally movement able element 1532 and frame connector 1542. Frame connector provides means to attached multi-position connector 1510 to frame 142.

Rotation of rotational element 1541 within passthrough 1535 allows for a change in the orientation of frame 142 with respect to head-strap 112.

Figure 19A:
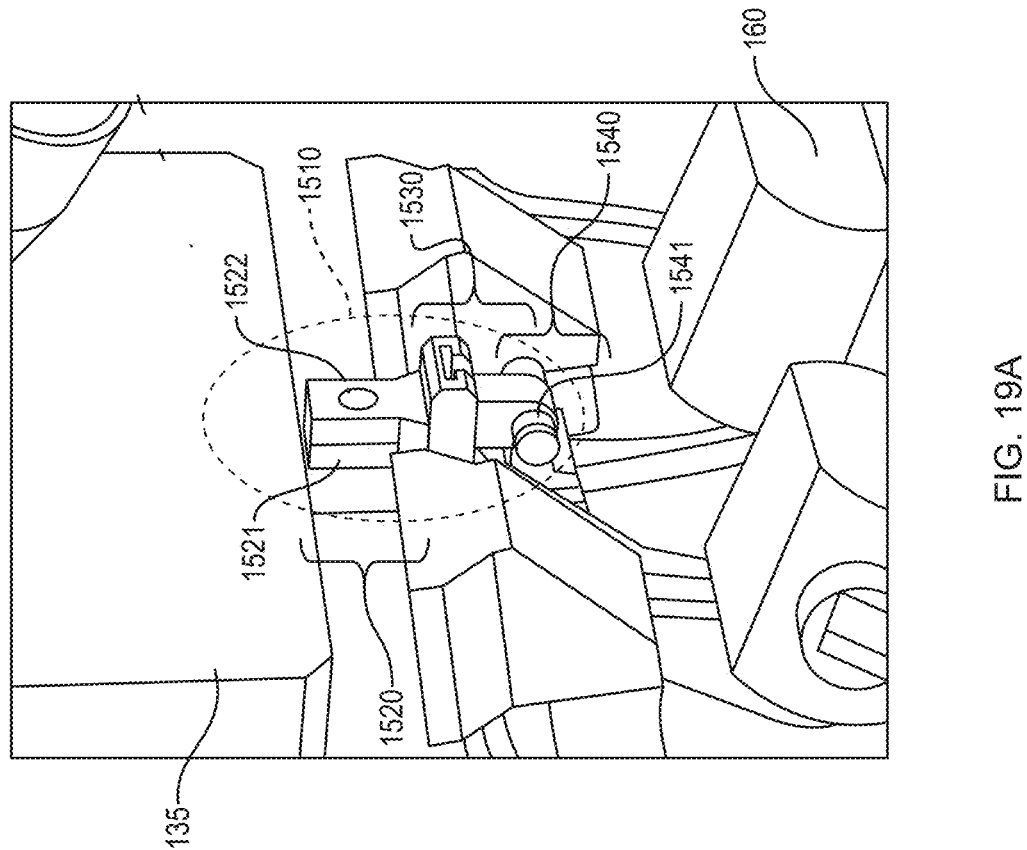
FIGS. 19A and 19B illustrate examples of a vertical and rotational movement of frame 142 in accordance with the principles of the invention. alignment shown in FIG. 18.
Figure 19B:
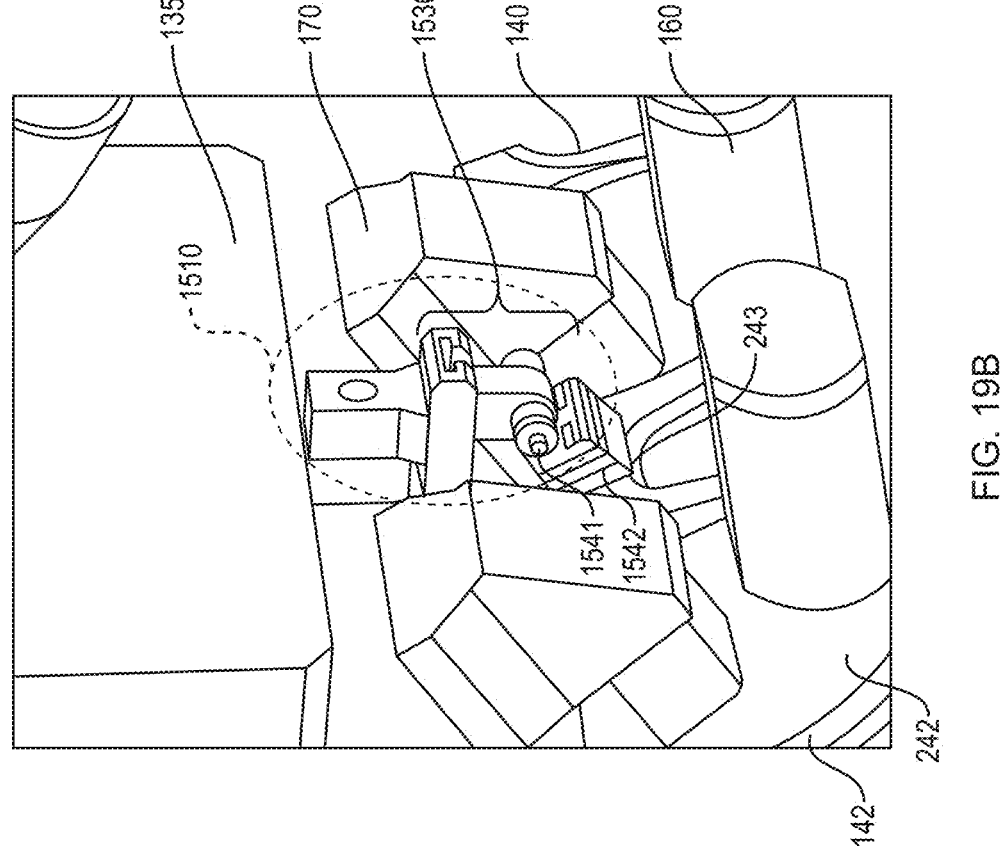

FIGS. 19A and 19B illustrate exemplary vertical and rotation movements associated with frame 142 in accordance with the principles of the invention.

FIG. 19A illustrates an example of the movement of frame 142 with respect processing unit 135, wherein frame is vertically raised by vertical movement element 1520 as evidenced by a distance between frame 142 and processing unit 135 being less than the distance shown in FIG. 18. In addition, the orientation of magnification devices 160 is shown in a downward orientation. That is, frame 142 is rotated such that magnification devices 160 are at an angle of declination with respect to a horizontal axis.

FIG. 19B illustrates a second example of the movement of frame 142 with respect to processing unit 135 wherein frame is vertically raised by vertical movement element 1520 as evidenced by a distance between frame 142 and processing unit 135 being less than the distance shown in FIG. 18. In addition, the orientation of magnification devices 160 is shown in an upward orientation.

Figure 20:
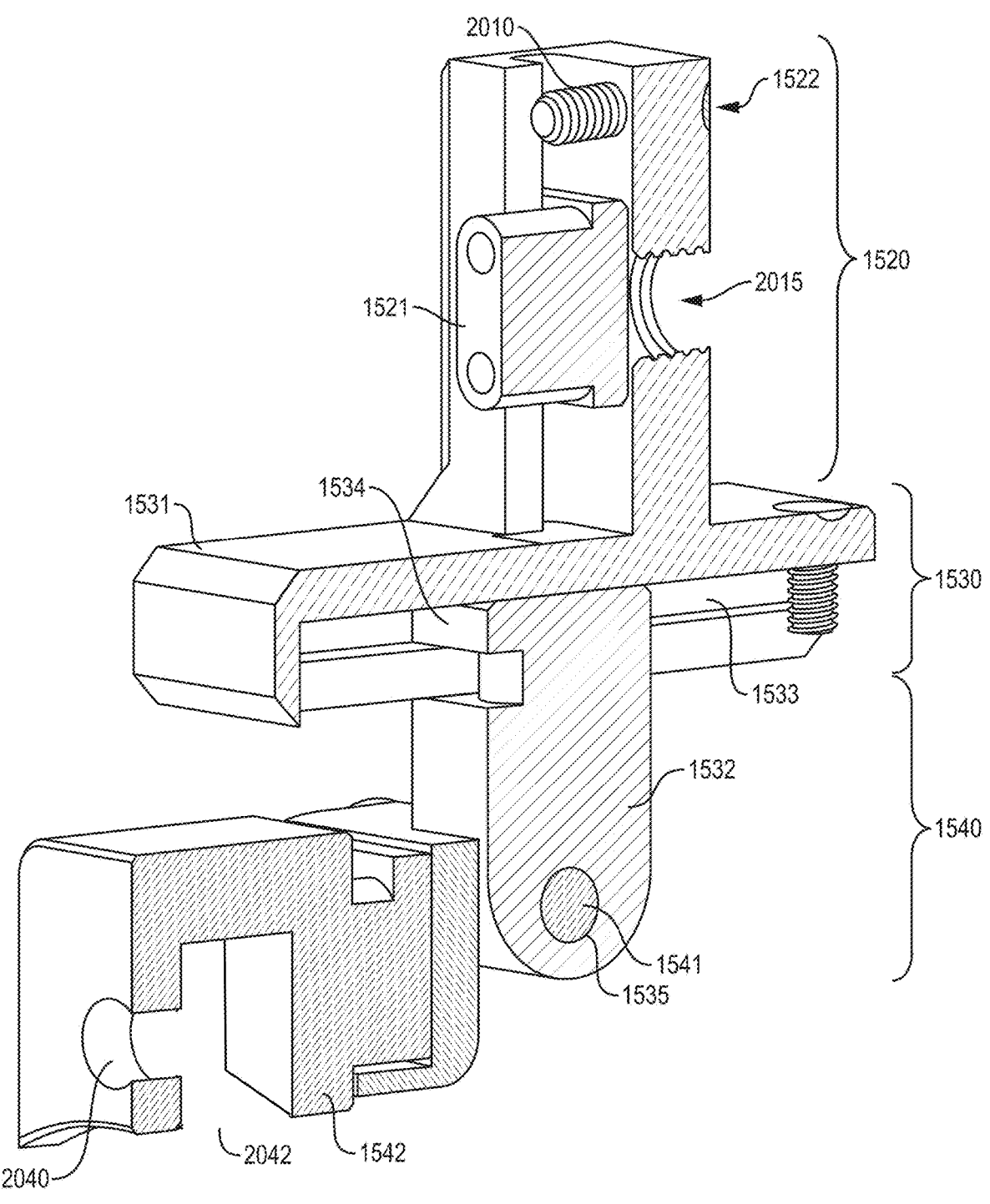
FIG. 20 illustrates a cut-away prospective view of a multi-positional element in in accordance with the principles of the invention.

FIG. 20 illustrates a cut-away prospective view of a multi-positional element in accordance with the principles of the invention.

In this illustrated view, element 1510 comprises vertical movement element 1510, horizontal movement element 1520 and rotational movement element 1530, as previously discussed.

Further illustrated is vertical stop 2010 that limits the vertical movement of movable element 1522 with respect to fixed element 1521 and opening 2015 within movable element 1522. Opening 2015 allows for the entry of a pin or screw (not shown) that engages fixed element 1521 to retain movable element fixed to fixed element 1521.

In addition, frame connector 1542 includes openings 2040 and 2042. Opening 2042 allows for the attachment of connector 1510 to frame 142 (not shown) and opening 2042 allows for the entry of a pin or screw (not shown) that retains connector 1510 to frame 142.

In summary, multiple embodiments of a head-born user-wearable visualization system with light enhancement have been disclosed, wherein the viewing and collection of images or video under natural (i.e., white) light and/or colored light (e.g., Infra-Red) conditions is discussed and the collected images may be processed and presented to a user on a display that is local to the visualization device. Further disclosed are different configurations of lighting assemblies that provide for the light necessary to collect images under natural light, a colored light, an ultra-violet light and an infra-red light.

Although the embodiments of the lighting assemblies show the light paths as being a single line, it would be understood by those skilled in the art that the light paths represent light beams that have a desired light beam width that would form a substantially circular light pattern centered substantially about the discussed common point (i.e., 350).

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above regarding specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A visualization system comprising:

at least one of: a headband and a headstrap:

a lighting/recording system attached to the at least one of:
  a headband and a headstrap, the lighting/recording system comprising:
  a first housing comprising:
    at least one lighting assembly configured to:
      emit a light in at least one of: a visible light wavelength range and a non-visible light wavelength range; and
    at least one lens, the at least one lens configured to:
      focus the emitted light a known distance from the lighting assembly;
  a second housing comprising:
    at least one image capture assembly comprising:
      at least one image capture device configured to:
        capture light associated with of an object positioned the known distance from the lighting assembly, wherein the captured light is representative of an image of the object;
an eyewear, attached to the at least one of: a headband and a headstrap by a multi-positional assembly, the eyewear comprising:
a first carrier lens; and
a second carrier lens, each of the first carrier lens and the second carrier lens comprising:

a magnification device, the magnification device configured to:

magnify, by a known magnification factor, the image of the object; wherein the multi-positional assembly is configured to:

provide at least one of: a vertical, a horizontal and a rotational positioning of the eyewear;

a display system associated with each of the first carrier lens and the second carrier lens, the display system comprising:

a display screen; and a processing system configured to:

receive the image captured by each of the at least one image capture device;

process the received image; and present the received images to a corresponding one of the display system.

2. The visualization system of claim 1, wherein each of the at least one lighting assembly comprises:

at least one lighting source, wherein each of the at least one lighting source is configured to:

emit the light in at least one wavelength band associated with at least one of:

a visible light wavelength band and a non-visible wavelength band.

3. The visualization system of claim 2, wherein the at least one lighting source is arranged on a base of an associated one of the at least one lighting assembly, wherein the at least one lighting source is configured to:

emit the light toward a known region on the at least one lens.

4. The visualization system of claim 2, wherein the at least one lighting source is arranged of an inner circumference of an associated one of the at least one lighting assembly.

5. The visualization system of claim 4, comprising:

a light director positioned on a base of the associated one of the at least one lighting assembly, wherein the light director comprises:

a plurality of reflective surfaces arranged at an angle with respect to the base, wherein the light director is configured to:

reflect the light emitted by a corresponding one of the at least one lighting source arranged on the inner circumference of the associated one of the at least one lighting assembly toward a known region on the at least one lens.

6. The visualization system of claim 5, wherein the plurality of reflective surface form a prismatic structure comprising:

an apex angle at an apex of the prismatic structure.

7. The visualization system of claim 5, wherein a gap is formed at the apex of the prismatic structure.

8. The visualization system of claim 7, at least one of the at least one lighting source is positioned on the base of the housing, at least one of the at least one lighting source positioned on the base is configured to:

emit a light through the gap formed at the apex of the prismatic structure toward the at least one objective lens.

9. The visualization system of claim 1, wherein the at least one image capture device comprises at least one of:

a digital camera, a CCD sensor and a CMOS sensor, wherein the image capture device is configured to:

capture the light in at least one of: an ambient light wavelength range, a visible light wavelength range and a non-visible light wavelength range.

10. The visualization system of claim 1, wherein the at least one image capture device is positioned on a base of a corresponding one of the at least one least one image capture assembly.

11. The visualization system of claim 1, wherein at least one image capture device is positioned on an inner circumference of at least one of the at least one the image capture assembly; and an optical light director positioned on a base of corresponding one of the at least one image capture assembly, the light director configured to:

direct light entering the image capture assembly to the at least one image capture device positioned on the inner circumference of the image capture assembly.

* * * * *